United States Patent
Sink et al.

(10) Patent No.: US 6,788,842 B1
(45) Date of Patent: Sep. 7, 2004

(54) METHOD AND APPARATUS FOR INTERNAL MONITORING AND CONTROL OF REFLECTORS IN AN OPTICAL SWITCH

(75) Inventors: Robert Kehl Sink, Santa Barbara, CA (US); John Edward Bowers, Santa Barbara, CA (US); Roger Jonathan Helkey, Montecito, CA (US); Robert Anderson, Santa Barbara, CA (US); Noel MacDonald, Santa Barbara, CA (US)

(73) Assignee: Calient Networks, San Jose, CA (US)

( * ) Notice: Subject to any disclaimer, the term of this patent is extended or adjusted under 35 U.S.C. 154(b) by 218 days.

(21) Appl. No.: 10/091,921

(22) Filed: Mar. 5, 2002

(51) Int. Cl.[7] ............................. G02B 6/35; G02B 6/06
(52) U.S. Cl. ......................... 385/18; 385/17; 385/116; 385/119
(58) Field of Search ....................... 385/17, 18

(56) References Cited

U.S. PATENT DOCUMENTS

| | | | |
|---|---|---|---|
| 5,461,425 A | | 10/1995 | Fowler et al. |
| 5,640,479 A | * | 6/1997 | Hegg et al. ................ 385/120 |
| 6,335,811 B1 | * | 1/2002 | Sakanaka ................... 398/129 |
| 2004/0047023 A1 | * | 3/2004 | Sandstrom ................. 359/238 |

FOREIGN PATENT DOCUMENTS

| WO | WO 99/66354 | 12/1999 |
|---|---|---|
| WO | WO 99/67666 | 12/1999 |

OTHER PUBLICATIONS

U.S. patent application Ser. No. 09/548,587, filed Apr. 30, 2000, Inventor: Bowers—Now Patent #6456751.
"Position Sensing Detectors Theory Of Operation" (Mar. 2002) On–Trak Photonics, Inc., Lake Forest, CA, www.on-trak.com[product documentation] 2 pp.

* cited by examiner

Primary Examiner—John D. Lee
Assistant Examiner—Tina M Lin
(74) Attorney, Agent, or Firm—Beyer Weaver & Thomas, LLP

(57) ABSTRACT

The disclosed embodiments include method and apparatus for detecting the alignment of movable reflectors in an optical switch. A diagnostic device embodiment includes a two-dimensional photoimager positioned to receive light from movable mirrors in the switch. Each movable mirror reflects light to different two-dimensional positions on the photoimager based on the position of each movable mirror, thereby creating a two-dimensional image of the reflector array. A controller receives information from the photoimager and adjusts the positions of the movable mirrors according to light received at the photoimager. A related diagnostic device includes an illumination source for directing monitor light beams onto the movable mirrors where the monitor beams are reflected onto the photoimager. This configuration provides two-dimensional information concerning the current position of the movable mirrors which is used to monitor and adjust the positions of the movable mirrors of the switch.

40 Claims, 13 Drawing Sheets

US 6,788,842 B1

METHOD AND APPARATUS FOR INTERNAL MONITORING AND CONTROL OF REFLECTORS IN AN OPTICAL SWITCH

TECHNICAL FIELD

The invention described herein relates to the monitoring of movable reflectors in optical switches. In particular, the invention relates to methods and apparatus for internally monitoring and controlling the orientation of movable reflectors in an optical switch. Still more particularly, some embodiments of the invention relate to methods and apparatus for using internal auxiliary monitor light beams to determine the position and orientation of movable reflectors of the optical switch so that the movable reflectors can be positioned and maintained at a desired orientation.

BACKGROUND

In recent years there have been extensive efforts to develop commercially fill viable optical switches. Presently there are a variety of different types of optical switch architectures available on the market. One proposed optical switch architecture contemplates the use of arrays of Micro Electro-Mechanical Systems (MEMS) mirrors to accomplish the switching. Such an optical switching system is described in International (PCT) Publication Number WO99/66354, naming Herzel Laor as inventor, and entitled, "PLANAR ARRAY OPTICAL SWITCH AND METHOD," published on Dec. 23, 1999, the entirety of which is incorporated herein by reference for all purposes. A perceived advantage of this type of optical switching system is that it is potentially scalable to many channels.

An example of a conventional MEMS mirror-based optical switching system is diagrammatically represented in FIG. 1A of the drawings. In the embodiment shown in FIG. 1A, the optical switch 100 includes an input fiber array 102 an input lens array 104 input and output reflector arrays 106, 108, an output lens array 110 and an output fiber array 112. According to the configuration of FIG. 1A, multiple optical inputs are used with an equal number of lenses to produce an equal number of approximately collimated input optical beams. The input and output mirror arrays 106, 108 each include a plurality of movable mirrors, such as mirror 106a. In the depicted embodiment, each movable mirror in the input and output mirror arrays is rotatable about two orthogonal axes so that an input beam received on any one of the input fibers can be directed towards a plurality of the output fibers by appropriately adjusting the orientation of their associated mirrors. The depicted embodiment is shown with an input optical beam 101a being directed through the switch into a selected output fiber as an output beam 101b. By changing the position of movable mirrors in the reflector arrays 106, 108 the input optical beams (e.g., 101a) can be switched to one of a plurality of output fibers as an output beam (e.g., 101b). The input and output fiber blocks 102, 112 are typically comprised of a two-dimensional array of fibers with polished end faces. The input fiber block 102 is positioned adjacent an input lens array 104 to provide collimated input beams, while the output lens array 110 is positioned adjacent to couple collimated output beams into output fiber block 112. The input and output mirror arrays 106, 108 each include a plurality of movable mirrors, such as mirror 106a. Although the depicted embodiment has movable mirrors configured to rotate in two axes, other embodiments have movable mirrors configured so that they are rotatable about a single axis.

In theory, the mirror arrays can be formed using a wide variety of techniques, and different companies have adopted different approaches in their attempts to provide suitable mirror arrays. By way of example, one approach is to create movable mirrors by forming MEMS structures on a monolithic silicon substrate. Devices such as these are commercially available from a variety of sources, including MCNC of Research Triangle Park, N.C. and Analog Devices of Cambridge, Mass.

An alternate embodiment 150 of a conventional MEMS mirror-based optical switching system is shown in FIG. 1B of the drawings. In this configuration, a "folded" optical path is provided by using a fixed mirror 158 that cooperates with a movable mirror array 106 so that an input beam 101a from fiber array 102 passes through lens array 104 to an input mirror 106a in movable mirror array 106. The input beam 101a is reflected off a first movable mirror 106a and directed to the fixed mirror 158, whereupon the beam is then reflected off of the fixed mirror 158 to an appropriate second movable mirror 106b which directs the beam (as output beam 101b) through the lens array 104 to a desired output channel in the fiber array 102. Thus, it will be appreciated that fiber array 102 may operate as both the input array of optical fibers and the output array of optical fibers. Thus, the fiber array 102 can include an input fiber array portion and an output fiber array portion.

In general, the movable mirror arrays 106, 112 of FIGS. 1A and 1B are populated with as many mirrors as fibers in the input/output fiber array; however, only two mirrors are shown for clarity. The mirrored configuration shown in FIG. 1B has the advantage that, in principle, any fiber can be switched to any other fiber, and so fibers do not have to be divided into sets of input fibers and output fibers.

By adjusting mirror position, optical beams can be steered from selected input fibers to selected output fibers. By monitoring and precisely adjusting the position of the movable mirrors, an optical beam from an input fiber can be switched to one of a plurality of output fibers, thereby accomplishing optical switching.

Another approach to achieving optical beam switching and mirror position control using monitor "taps" to measure a portion of optical beam power using such measurements to adjust mirror position. FIG. 2 depicts one such approach. FIG. 2 shows a plurality of input fibers 1 feeding input signals into an optical switching apparatus 5. The switch directs the signals to the desired output fibers 4 where they can be transmitted through the system. The optical power of the input signals is tapped from the input fibers 1 by fiber taps that direct a portion of the signal into detectors 2 where the optical power is measured. Similarly, output optical power is tapped from the output fibers 4 and detected by detectors 3 where the optical power is measured. These measurements are compared, and using loss optimization techniques the position of movable mirrors in the switch 5 is adjusted to produce output beams of a desired power. However, such switches require complex signal processing algorithms and require the use of many expensive optical taps and optical detectors, thereby driving up the cost.

FIG. 3 is a block diagram of yet another approach. This approach is disclosed in the International Patent WO 99/67666 to H. Laor, which is hereby incorporated by reference. In the depicted optical switch, an optical signal 29 is input through an input fiber 21. The input signal 29 is directed onto a first movable mirror 25a that steers the signal 29 onto the second movable mirror 25b, which reflects the signal 29 into the desired output fiber 24. Additional components are used to monitor the mirror orientation (position). Arranged along the signal 29 path are a first beam splitter 31, a second beam splitter 32, a third beam splitter 33, a fourth beam splitter 34, a first lens 26a, and a second lens 26b. Also included are a first laser 27, a second laser 28, a first detector 22, and a second detector 23. The first laser 27 generates a forward propagating laser beam that is directed along the optical path toward the output fiber 24. After passing through a plurality of beam splitters 32, 33, lens 26b, and both mirrors 25a, 25b, the beam passes through the fourth beam splitter 34, where a portion of the beam is directed into the second detector 23, where it is measured. Similarly, a beam generated by the second laser 28 is back propagated toward the input fiber 21. A portion of this beam is split by first beam splitter 31, which directs a portion of the beam into the first detector 22, where it is measured. These two measurements are used to determine if the movable mirrors 25a, 25b are correctly oriented. The large number of lasers, beam splitters, and detectors in this device can be cost prohibitive.

These attempts to solve the problem of monitoring and controlling movable mirror position forgoing problems have met with mixed success. Such conventional switches are expensive, difficult to construct, and suffer from reduced optical throughput. What is needed is a lower cost apparatus and technique for monitoring the position of the movable mirrors in an optical switch.

SUMMARY OF THE INVENTION

In accordance with the principles of the present invention, an apparatus and method for monitoring and adjusting the position of movable mirrors in an optical switch is disclosed.

One embodiment discloses a diagnostic device for detecting the alignment of movable reflectors in an optical switch. The device can be incorporated into an optical switch that includes optical input fibers, optical output fibers, and an array of movable mirrors. Such mirrors are capable of occupying a plurality of positions. The movable mirrors are configured to steer input light beams received from the array of input fibers along a signal path so that each input light beam can be switched to one of a plurality of output fibers as an output beam. The diagnostic device embodiment includes a two-dimensional photoimager positioned to receive light from the reflector array. Each movable mirror of the reflector array reflects light to different two-dimensional positions on the photoimager based on the current position of each movable mirror, thereby creating a two-dimensional image of the reflector array. A controller receives information from the photoimager and adjusts the positions of the movable mirrors of the reflector array according to light received at the photoimager.

In another embodiment, an optical switch includes an array of optical input fibers configured to carry input light beams and an array of output fibers. The switch includes a switching element including a reflector array having movable mirrors. Each movable mirror is adjustable to a plurality of positions suitable for reflecting selected input light beams received from selected input fibers into selected output fibers, enabling the switching of each input light beam along a signal path to one of a plurality of output fibers as an output beam. The switch also includes a diagnostic device having an illumination source for directing monitor light beams onto the movable mirrors of the reflector array where the monitor beams are reflected onto a photoimager. The photoimager is arranged to receive monitor light beams reflected from the movable mirrors, with each movable mirror of the reflector array reflecting light onto a different two-dimensional position on the photoimager depending on which one of the plurality of positions each mirror currently occupies. This configuration provides two-dimensional information concerning the current position of the movable mirrors. The switch also includes a controller for adjusting the position of the movable mirrors of the reflector array according to light received at the photoimager.

Another aspect of the invention includes an anti-reflective coating embodiment. The anti-reflective coating can receive light incident at angles ranging from about 5 degrees to about 55 degrees, and transmit the light in a first bandpass region for transmitting light having a wavelength of less than 1 $\mu$m and a second bandpass region for transmitting light having a wavelength of greater than 1 $\mu$m.

Yet another embodiment includes a method for detecting whether movable mirrors in an optical switch have a desired orientation. The method comprises the steps of directing at least one light beam onto movable mirrors of a reflector array in an optical switch and receiving a light beam reflected from the movable mirrors of the reflector array. The two-dimensional position of the at least one reflected light beam is detected and compared to a two-dimensional position of a reflected light beam having a desired two-dimensional position that corresponds to that of a movable mirror having the desired orientation. Using this information, a determination is made as to whether the movable mirror is positioned at the desired orientation. If the mirror does not occupy the desired position, the method adjusts the mirror until the desired position is attained.

These and other aspects and advantages of the invention will become apparent from the following detailed description and accompanying drawings which illustrate, by way of example, the principles of the invention.

BRIEF DESCRIPTION OF THE DRAWINGS

For a fuller understanding of the invention, reference is made to the accompanying drawings in the following Detailed Description. In the drawings.

Figure 1A:
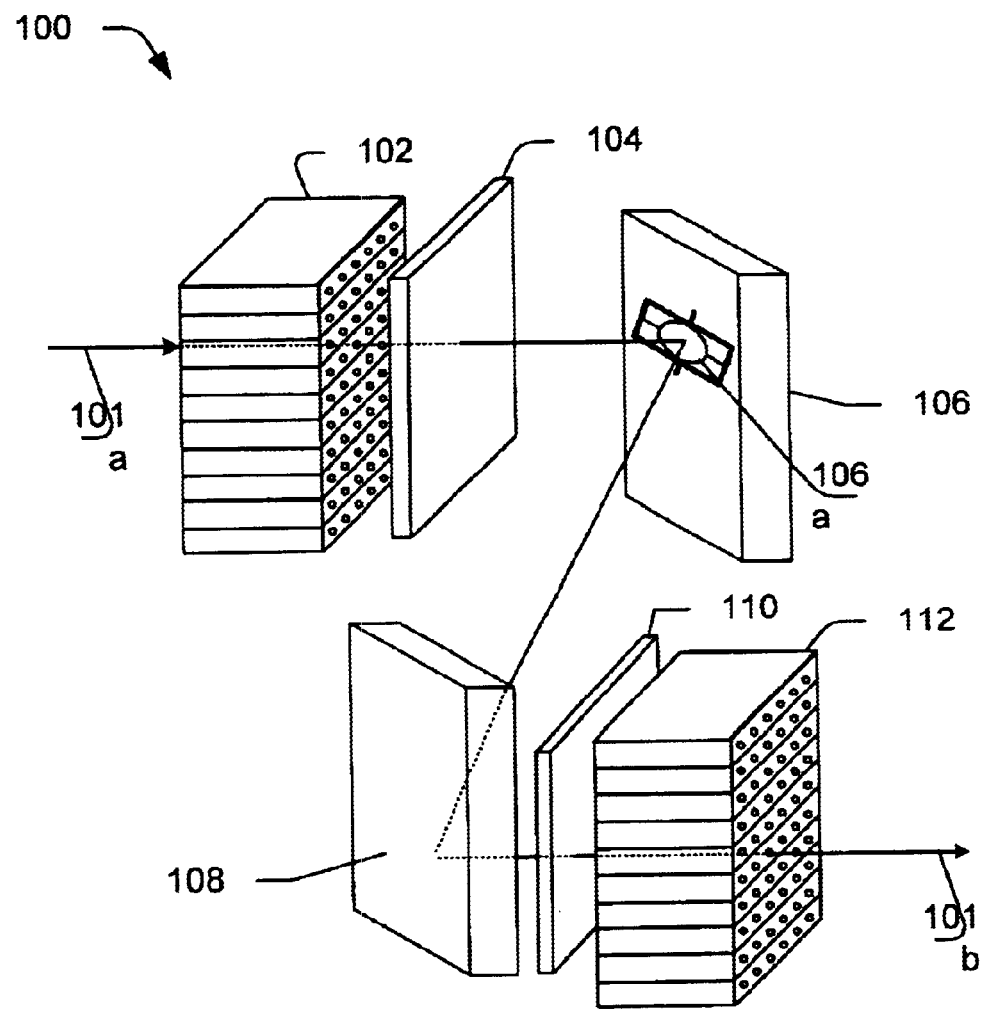
FIGS. 1A and 1B are views of conventional switch apparatus.
Figure 1B:
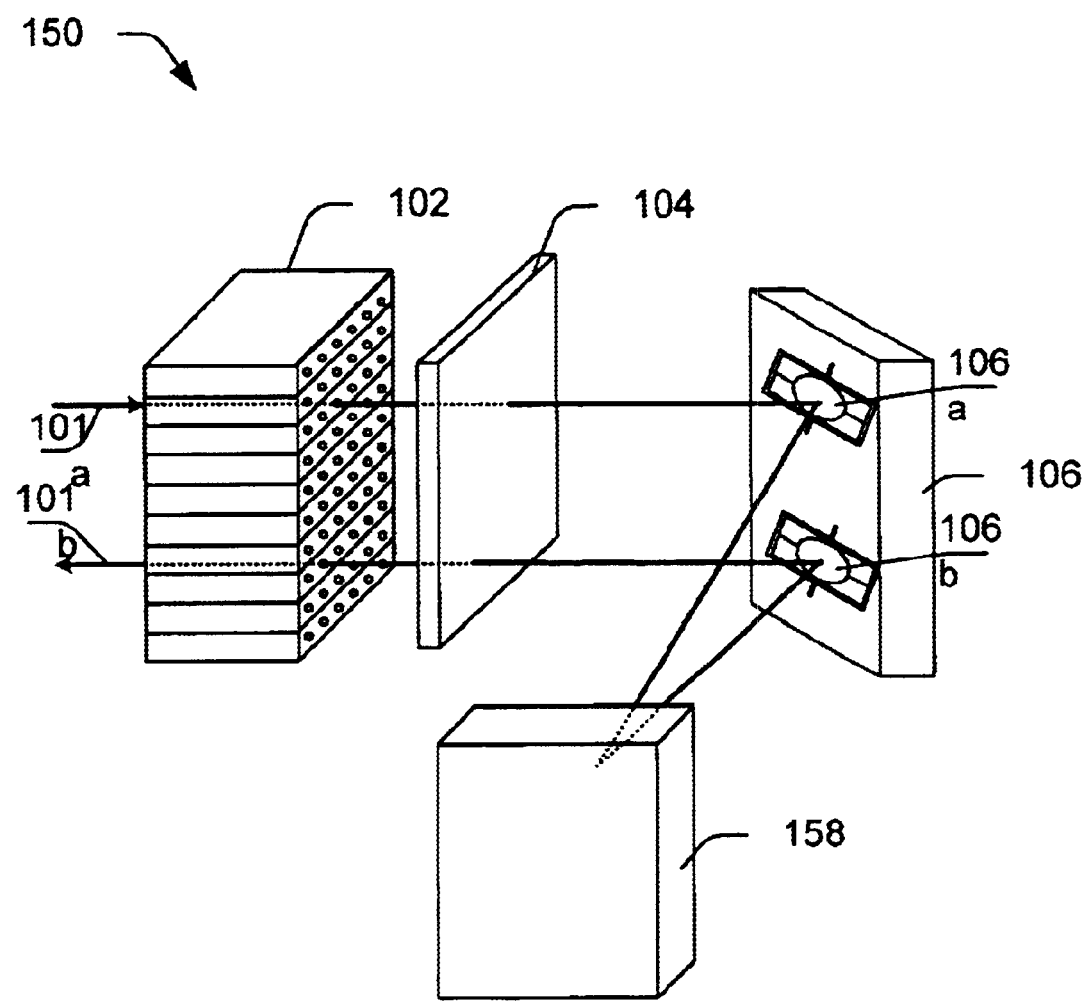
Figure 2:
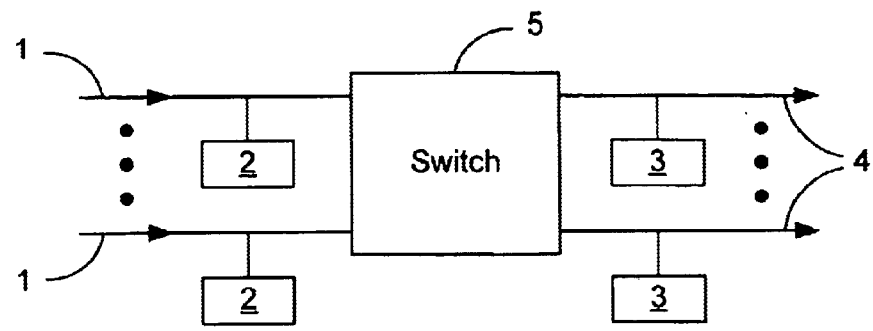
FIG. 2 is a block diagram of an optical cross-connect switch that uses direct measurement of fiber coupled optical power to adjust beam position in an optical switch.
Figure 3:
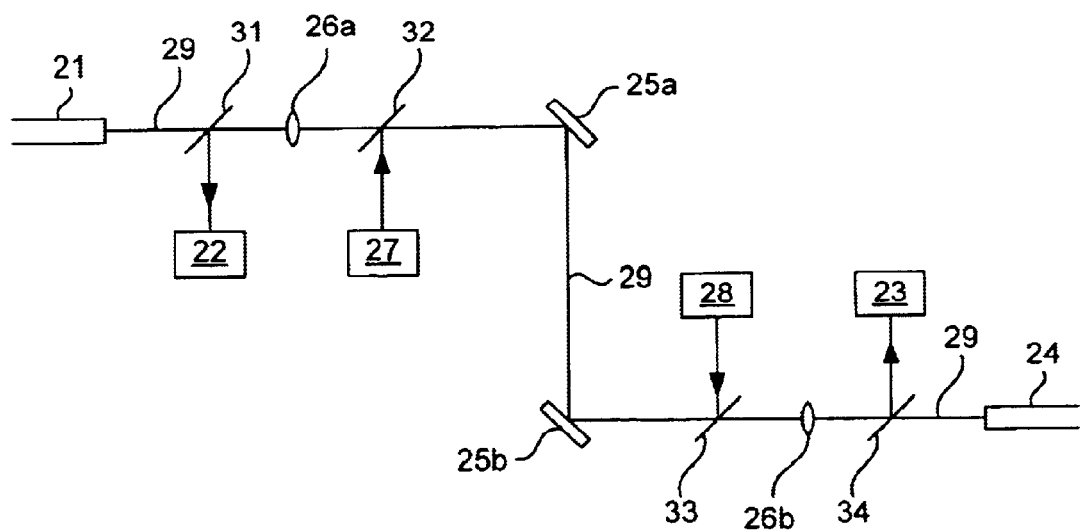
FIG. 3 is a block diagram of an optical cross-connect switch that uses a plurality of monitoring lasers and beam splitters coupled to input and output optical beams to measure optical power in the optical switch.

In the drawings, the depicted elements are not necessarily drawn to scale. Also, reference numerals refer to the same or equivalent parts of the present invention throughout the several figures of the drawings.

DETAILED DESCRIPTION OF THE DRAWINGS

The present invention has been particularly shown and described with respect to certain embodiments and specific features thereof. The embodiments set forth hereinbelow are to be taken as illustrative rather than limiting. It should be readily apparent to those of ordinary skill in the art that various changes and modifications in form and detail may be made without departing from the spirit and scope of the invention.

Figure 4:
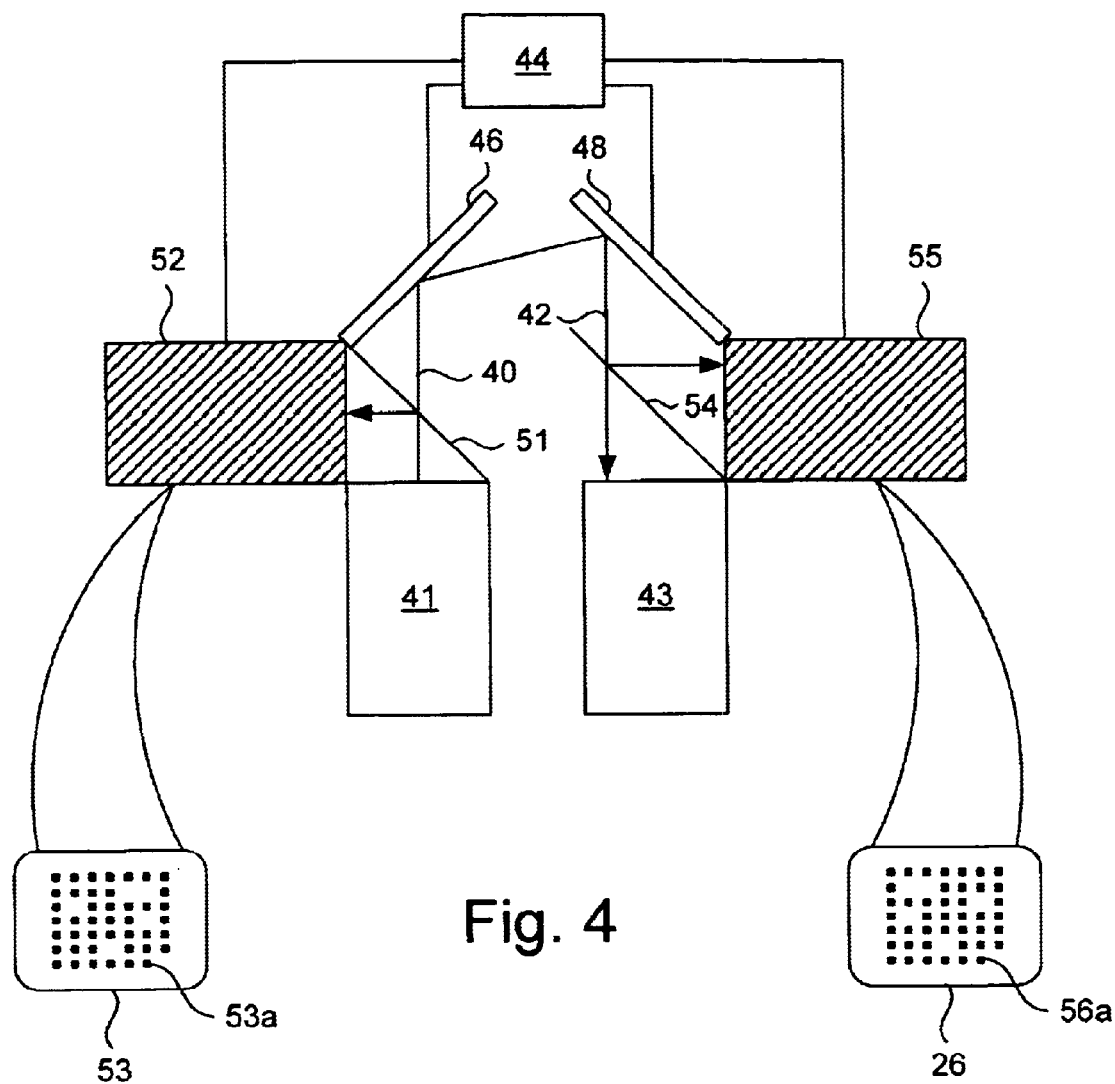
FIG. 4 is a figurative illustration of a optical switch and photoimager embodiment illustrating aspects of the invention in accordance with the principles of the present invention.

FIG. 4 depicts an embodiment of a device used to monitor and adjust the orientation of movable mirrors in an optical switch. The depicted embodiment includes a plurality of optical fibers configured in an M×N array arranged in an input fiber block, a plurality of optical fibers configured in an M×N array arranged in an output fiber block, reflector arrays having a plurality of MEMS mirrors, a pair of beam splitters, a pair of photoimagers, and a controller.

The depicted embodiment includes a plurality of optical fibers arranged in an input fiber block 41. Input light beams 40 (such light beams typically carry optical signals) pass through the optical fibers of the input fiber block 41 and are directed onto movable mirrors of a first reflector array 46. These input beams 40 can be of many different wavelengths (such as with WDM or other related applications). Preferred wavelengths are in the range of about 1.26 $\mu$m to about 1.6 $\mu$m. The mirrors of the first reflector array 46 are oriented so that the input beams 40 are reflected onto movable mirrors of a second reflector array 48. The mirrors of the second reflector array 48 are oriented so that the input beams 40 are reflected (as an output beam 42) into selected optical output fibers of the output fiber block 43. In this respect, the depicted embodiment operates similarly to the embodiment depicted in FIG. 1A. Many different types of reflector array structures can be used to form the reflector arrays 46, 48 of the depicted embodiment. One suitable reflector array is a MEMS reflector array having a plurality of movable mirrors formed on a monolithic silicon substrate. In one preferred example, the MEMS reflector array includes a plurality of movable mirrors arranged in an M×N array of movable mirrors. Preferably the integer values for M and N are two (2) or greater. Devices such as these are commercially available from a variety of sources including MCNC of Research Triangle Park, N.C. and Analog Devices of Cambridge, Mass.

The depicted embodiment further includes a first beam splitter 51 and a second beam splitter 54. The first beam splitter 51 is configured to direct a portion of the input beams 40 into a first photoimager 52. The second beam splitter 54 is positioned to direct a portion of the output beams 42 into a second photoimager 55. In one embodiment, the first beam splitter 51 is a 4% beam splitter that transmits about 96% of the input beam 41 to the movable mirrors of the first reflector array 46, and reflects a small portion of the input beam 40 into the first photoimager 52. Similarly, the second beam splitter 54 can be a 4% beam splitter that transmits about 96% of the output beam 42 to the optical output fibers of the output fiber block 43, and reflects a small portion of the output beam 42 into the second photoimager 55. Other beam splitters can be used. In one implementation, the first and second photoimagers 52, 55 are sensitive to the wavelengths of light used in the signal carrying light beams 40, 42. These wavelengths are typically greater than 1 $\mu$m (micrometer) and preferably in the range of about 1.3 $\mu$m to about 1.55 $\mu$m. Such photoimagers can comprise arrays of light sensitive photodetectors including, but not limited to, charge coupled device (CCD) arrays, diode photodetector arrays, or CMOS digital detector arrays. Such diode photo detector arrays can include semiconductor photodetectors with layers consisting of metal-semiconductor-metal (MSM) or p-doping,intrinsic-doping, and n-doping (p-i-n). Suitable CMOS digital detector arrays are described, for example, in the U.S. Pat. No. 5,461,425 to Fowler, et al., entitled "CMOS Image Sensor with Pixel Level A/D Conversion", hereby incorporated by reference. One example of a photoimager embodiment operates by measuring light in the 1.3 um to 1.55 um band. Alternatively, the photoimager can convert the light to wavelengths where the photoimager is sensitive. In one example, a phosphor coated micro-channel plate is used to collect charge and emit light. When used with a M×N movable mirror array, an array of light sensitive photodetectors having at least 3(M×N) light sensitive photodetectors is required, in order to separately determine the position of each of the M×N beams in two axes. However, in one preferred implementation, the photoimager includes an array of light sensitive photodetectors having at least 4(M×N) light sensitive photodetectors. Additionally, arrays of position sensitive photodetectors can be used. For example, micro-scale quadrature detectors may be used. Additionally, arrays of "Duolateral Two-Dimensional PSD" position sensitive detectors that allow light position and intensity to be measured simultaneously, like those manufactured by SiTek Electro Optics and obtainable from On-Trac Photonics, Inc. of Lake Forest, Calif., can also be used. Such detectors are also referred to herein as duolateral position sensitive photodetectors.

Some photoimager 52, 55 embodiments can produce two-dimensional depictions of the light incident on the photoimager 52, 55 (for example, an image of the input beams 40 or output beams 42). These depictions (also referred to as images) produce patterns of light. Figurative examples of two-dimensional images of light patterns on the first and second photodetectors 52, 55 are shown by images 53 and 56, respectively. Referring to the first photoimager 52, when the mirrors of the reflector arrays 46, 48 are positioned at a desired orientation, a certain two-dimensional image or pattern of light "dots" 53a (when referring to photoimager 52) corresponding to each input beam 40 is formed by the first photoimager 52. And referring to the second photoimager 55, another two-dimensional image or pattern of light "dots" 56a (when referring to photoimager 55) is formed by the second photoimager 55, corresponding to each input beam 40. As the mirrors of the reflector arrays 46, 48 and/or the alignment of the beams drift from their desired position, photoimagers 52 and 55 detect the drift as movement of the dots 53a and dots 56a. This information is fed to a controller 44 which is connected to the reflector arrays 46, 48 and the photoimagers 52, 55. The controller 44 includes electronic circuitry capable of controlling the position of the movable mirrors of the reflector arrays 46, 48. The controller 44 processes the information and adjusts the movable mirrors of the reflector arrays according to light received at the photoimagers 52, 55. The controller 44 can include a digital signal processor and memory, all programmed to process information received from the photoimager 52, 55 and based thereon, make adjustments to movable mirror position. Similarly, the controller 44 uses information provided by the second photoimager 55 to adjust the movable mirrors of the reflector arrays 46, 48. In addition, rather than just tracking the drift of mirror position from their desired orientation, the controller 44 can include information stored in lookup tables that provide mirror orientation information in order to adjust and compare mirror position as measured with the desired position. This can be accomplished using methods known to persons having ordinary skill in the art. It should be noted that the photoimagers 52, 55 can be made sensitive to light having wavelengths other than the signal wavelengths; for example, at wavelengths less than 1 $\mu$m. In such cases, monitor beams that do not carry signal information can be transmitted through the optical fibers and be used to monitor and adjust mirror orientation. As explained above, when the mirrors of the reflector arrays 46, 48 are positioned at a desired orientation, two-dimensional images or pattern of "dots" 53, 56 are formed by the photoimagers 52, 55. As the mirrors of the reflector arrays 46, 48 drift from their desired position, the photoimagers 52, 55 detect the drift. Using the controller 44, which is connected to the reflector arrays 46, 48 and the photoimagers 52, 55, the orientation of the mirrors can be adjusted until desired mirror orientations are achieved. As previously discussed, the controller 44 processes the information and adjusts the movable mirrors of the reflector arrays according to light received at the photoimagers 52, 55.

Figure 5A:
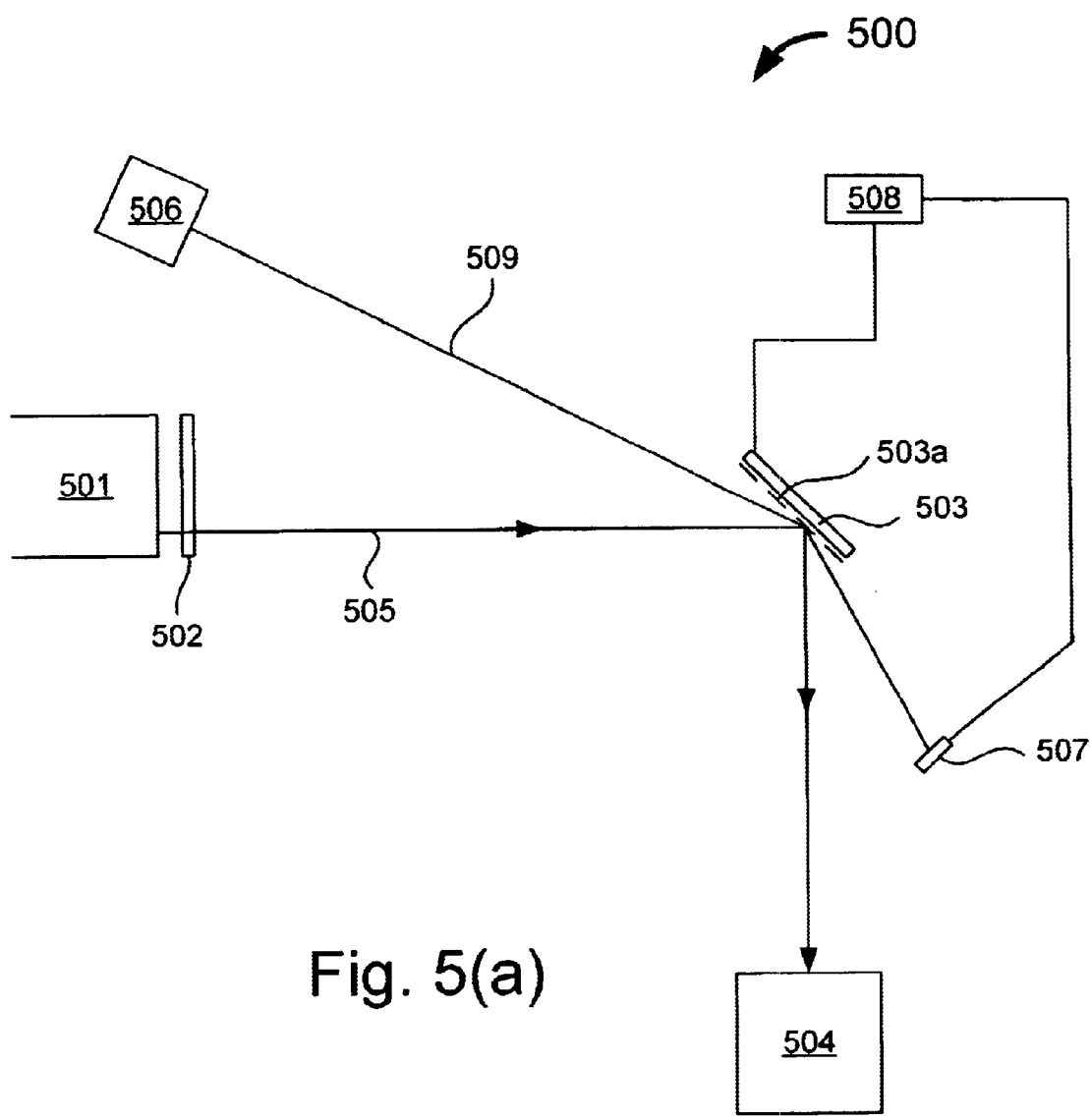
FIG. 5(a) is a figurative illustration of an optical switch embodiment having a separate illumination source generating monitor beams that are detected by a photoimager in accordance with the principles of the present invention.

In another embodiment, FIG. 5(a) depicts a portion of an optical switch embodiment in accordance with the principles of the present invention. The switch includes a separate illumination source for generating monitoring beams and a photoimager. The illumination source is positioned to generate monitoring beams that are received by the photoimager. Additionally, in the depicted embodiment the monitoring beams are directed onto the movable mirrors of the reflector array from a position that is independent from the signal path traveled by the signal carrying light beams. Thus, the monitor beams travel along optical paths that do not follow operating signal paths. As with the foregoing embodiments, the photoimager is used to determine whether movable mirrors of reflector arrays are positioned having the desired orientation. Based on information provided by the photoimager, the movable mirrors of the reflector array can be monitored and adjusted. One of the many advantages of such an arrangement is that the wavelength of the monitor beams need not be in the same wavelength bandwidth as the signal light beams carried by the optical fibers. Therefore, the monitor beams can be generated having wavelengths less than 1 $\mu$m. This is advantageous because it permits the use of low cost photoimagers. These and other advantages of the depicted embodiment are described hereinbelow. It is to be noted that FIG. 5(a) only depicts a portion of an optical switch and diagnostic device embodiment. Many embodiments have more than one reflector array. In such embodiments, the movable mirrors of the other reflector arrays also have diagnostic devices positioned to monitor and adjust the position of the mirrors of these reflector arrays.

FIG. 5(a) is a top view of a portion of a switch embodiment 500 that includes a plurality of optical fibers configured in an M×N array and arranged in an input fiber block 501, a plurality of M×N microlenses arranged in a microlens array 502, a reflector array 503 having a plurality of MEMS mirrors for steering input optical beams from input fibers to the remaining portions of the switch 504, where in ordinary course of operation, the input optical beams are directed into desired output fibers. For simplicity of explanation, the depicted embodiment is shown having a single signal carrying optical input beam that travels along a signal path 505 to its designated output fiber (not shown here). In other embodiments, a plurality of signal carrying optical input beams are traveling along a plurality of signal paths. The depicted embodiment further includes a diagnostic device for monitoring and adjusting the movable mirrors of the reflector array 503. The diagnostic device includes a monitor illumination source 506 and a photoimager 507. The reflector array 503 and the photoimager 507 are connected to a controller 508. Based on information provided by the photoimager 507, the controller 508 monitors and adjusts the position of the movable mirrors of the reflector array.

The depicted monitor illumination source 506 (also referred to as an illumination source) generates as many monitor light beams as needed. For simplicity of explanation, a single monitor light beam is shown. In most embodiments, a monitor beam is generated for each one of the plurality of movable mirrors in the reflector array 503. The depicted monitor beam is directed onto the movable mirrors (e.g., movable mirror 503a) of the reflector array 503 along a monitor beam path 509. Unlike the foregoing embodiments, in the depicted embodiment the monitor beam path 509 is not the same as the signal path 505. In the depicted embodiment, the monitor beam path 509 is not coincident with the signal path 505 except for the possibility that both optical paths 505, 509 can intersect at a movable mirror 503a of the reflector array 503. Each monitor light beam is reflected by a movable mirror which corresponds to that monitor light beam. The reflected monitor beam is received by a photoimager 507, which can be used to form images of the monitor beams. In one implementation, the photoimager 507 is sensitive to the wavelengths of light that are less than 1 $\mu$m. This is advantageous because such photoimagers 507 can be produced for a relatively low cost. In such cases, one suitable illumination source 506 is a gallium arsenide (GaAs) laser. Such GaAs lasers are low cost devices and capable of delivering light beams having wavelengths of light that are less than 1 $\mu$m. Other illumination sources having similar optical properties can also be used. Suitable photoimagers 507 can comprise arrays of light sensitive photodetectors including, but not limited to, charge coupled device (CCD) arrays, diode photodetector arrays, or CMOS digital detector arrays. Additionally, arrays of position sensitive photodetectors can be used. For example, micro-scale quadrature detectors or "Duolateral Two-Dimensional PSD" position sensitive detectors may be used. Such two-dimensional photoimager 507 embodiments can produce two-dimensional representations (referred to herein as images) of light beams incident on the photoimager 507.

In one approach, the reflector array is sealed in a hermetically sealed case having a transparent face. Reflection from this face can cause undesirable effects, such as crosstalk, "ghosting", optical power loss, and erroneous readings. An anti-reflection coating (ARC) can be coated on one or both sides of the transparent face to provide improved optical performance for both the signal beams and the monitor beams.

Figure 5B:
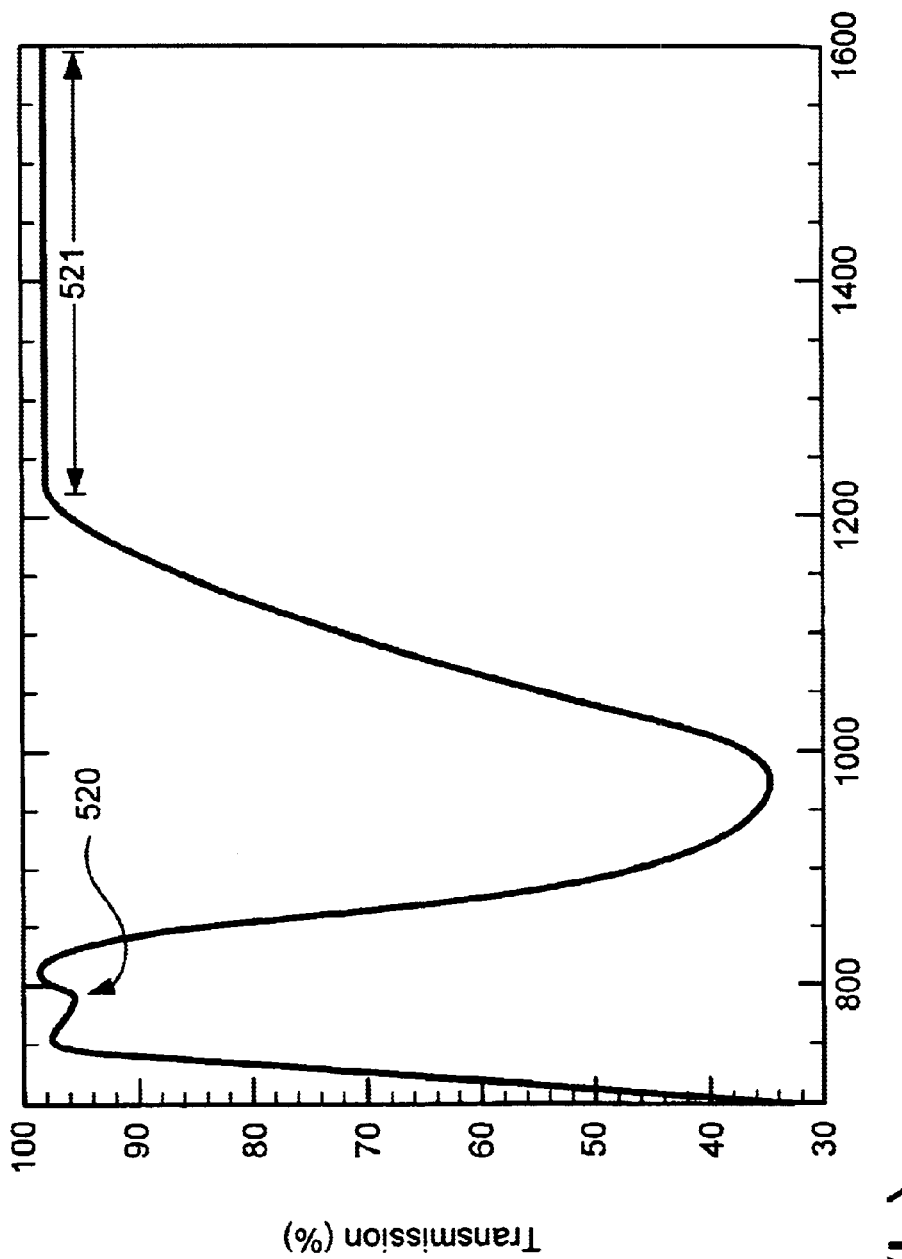
FIG. 5(b) is a graphical depiction of an anti-reflective coating embodiment suitable for use with some embodiments of the present invention.
Figure 6A:
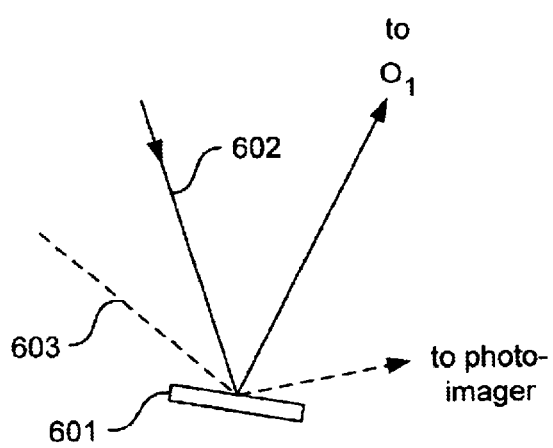
FIGS. 6(a) and 6(b) are simplified depictions of an embodiment showing the relationship between signal beam, monitor beam source, and photoimager, illustrating aspects of optical switch operation in accordance with the principles of the present invention.
Figure 6B:
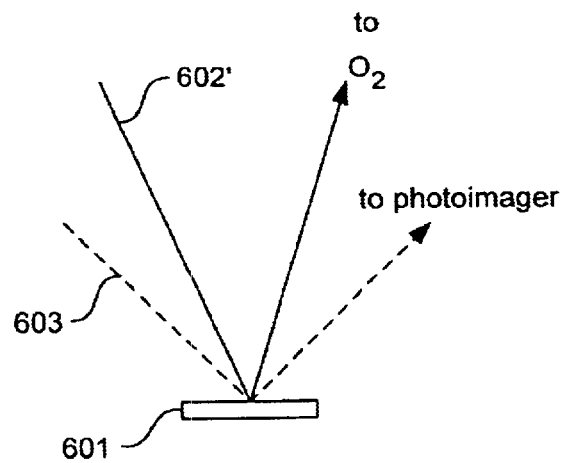
Figure 6C:
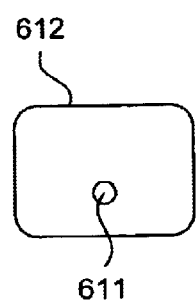
FIGS. 6(c) and 6(d) are simplified depictions of a photoimager embodiment showing two-dimensional images tracking the movement of a monitor beam in an optical switch in accordance with the principles of the present invention.
Figure 6D:
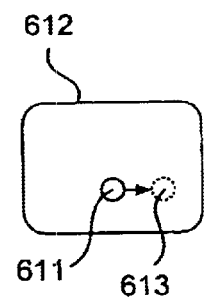

In embodiments such as that depicted in FIG. 5(*a*) where light in two distinct bandwidths is used in the switch, special anti-reflective coatings (ARC) can be used to prevent reflection at both bandwidths. For example, an optical switch can carry signals in input optical light beams in a selected bandwidth (in one example, in a bandwidth ranging from about 1.3 $\mu$m to about 1.55 $\mu$m). Also monitor beams in another bandwidth (e.g., less than 1 $\mu$m), can be used within the switch. In order to achieve improved performance, the ARC should have a first transmission bandwidth permitting a high degree of light transmission for the monitor beam (e.g., in the range of about 0.75 $\mu$m to 0.85 $\mu$m). Also the ARC should have a region of high transmissivity for the signal beams (e.g., above 1 $\mu$m and particularly in the range of about 1.26 $\mu$m to 1.625 $\mu$m, and more particularly in the range of about 1.3 $\mu$m to 1.55 $\mu$m).

FIG. 5(*b*) graphically illustrates a transmission spectrum for one suitable ARC embodiment in accordance with the principles of the present invention. A first transmission bandwidth 520 is centered in the region around 0.8 $\mu$m and lies in the range of about 0.75 $\mu$m to 0.085 $\mu$m. This provides an effective light transmission window for monitor beams. A second transmission bandwidth 521 is depicted. This region 521 has high transmissivity for the signal beams. In the depicted embodiment, light transmission is high above about 1.1 $\mu$m. In particular, light transmission is high in the range of about 1.26 $\mu$m to 1.625 $\mu$m (a commonly used optical signal bandwidth). Such an ARC can be made, for example, by using alternating layers of $Ta_2O_5$ and $SiO_2$, each having appropriate thicknesses. Such an ARC can be used on many of the embodiments disclosed herein. In one particular embodiment, the ARC comprises eight alternating layers of $Ta_2O_5$ and $SiO_2$. The following table provides details for such an ARC:

| Layer No. | Material | Thickness |
| --- | --- | --- |
| 1 | $Ta_2O_5$ | 67.7 nm |
| 2 | $SiO_2$ | 73.9 nm |
| 3 | $Ta_2O_5$ | 265.6 nm |
| 4 | $SiO_2$ | 90.8 nm |
| 5 | $Ta_2O_5$ | 114.8 nm |
| 6 | $SiO_2$ | 82.0 nm |
| 7 | $Ta_2O_5$ | 239.2 nm |
| 8 | $SiO_2$ | 280.3 nm |

The above-described ARC embodiment is particularly advantageous because it has high light transmission in two bandwidths (e.g., a first bandwidth at about 0.75 $\mu$m to 0.085 $\mu$m and another bandwidth at about 1.26 $\mu$m to 1.625 $\mu$m), and it functions effectively as an ARC for light incident on the ARC at angles from between about 0° to about 60°, and more particularly at angles from between about 5° to about 55°.

FIGS. 6(*a*)–6(*d*) schematically illustrate aspects of operation of certain diagnostic device embodiments. FIGS. 6(*a*) and 6(*b*) both depict the same movable mirror 601 when it is positioned at two different orientations during operation. Each mirror of a reflector array is capable of assuming a plurality of discrete positions. Each of the discrete positions reflects an incident light beam to a different location. As a result, light beams can be directed to specific locations depending on the specific movable mirror position. FIG. 6(*a*) shows a movable mirror 601 at a first position. For example, at the first position movable mirror 601 is oriented such that an optical input signal 602 is reflected from the movable mirror 601 into, for example, a first output fiber $O_1$. Also, a monitor beam 603 is directed onto the movable mirror 601. The monitor beam 603 is reflected by the movable mirror 601 onto a photoimager which detects the position of the reflected beam. For each desired orientation of each movable mirror 601, the reflected monitor beam 603 is incident on a different two-dimensional position on the photoimager. In the depicted illustrations, the movable mirror 601 is depicted as movable about one axis. The inventors contemplate movable mirror embodiments capable of movement in two axes. In both cases, the principles of operation are similar.

FIG. 6(*c*) depicts a spot of light 611 displayed on a photoimager image 612. As the spot 611 drifts from the desired location, the photoimager detects the drift This information is received by a controller that adjusts the mirror until the spot 611 is at the desired location.

When an optical switch has need to change the configuration of light beams, as in optical switching operations, the relevant movable mirrors are adjusted to new orientations that direct the light beam to the desired location. For example, FIG. 6(*b*) shows the movable mirror 601 after movement to a second position. In this second position, the movable mirror 601 is oriented to reflect an optical input signal 602' to a new location, for example, into a second output fiber $O_2$. Again, the monitor beam 603 is directed onto the movable mirror 601. The monitor beam 603 is reflected by the movable mirror 601 onto a photoimager which detects the position of the reflected beam. FIG. 6(*d*) is an example that illustrates the movement of a light spot from its original position 611 to a new position 613 corresponding to a mirror orientation that directs light beam 602' into second output fiber $O_2$. This is detected by the photoimager which monitors the position of incident spots of light and adjusts the movable mirrors accordingly.

Figure 7:
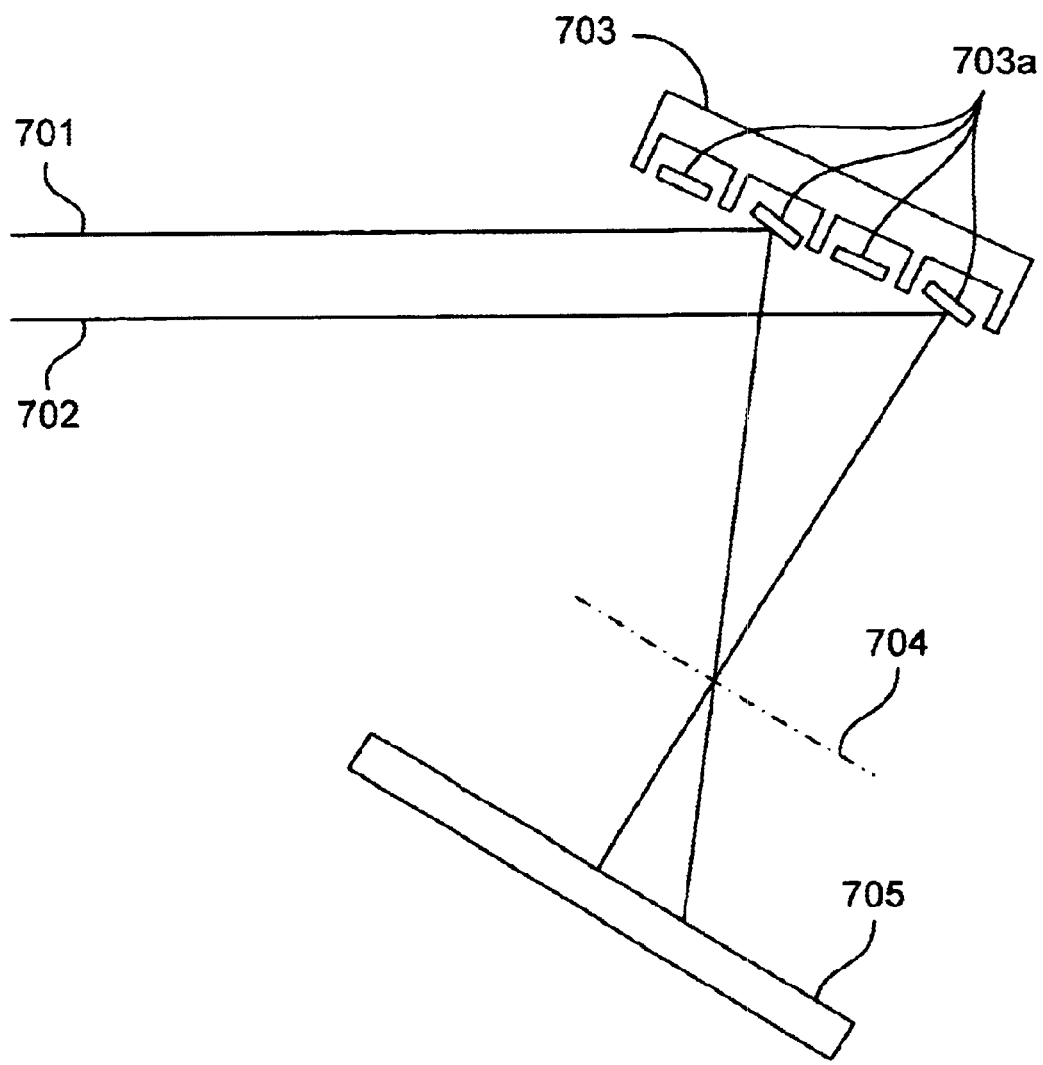
FIG. 7 is a simplified depiction of the relationship between movable mirrors of a reflector array and a photo-imager in accordance with the principles of the present invention.

In the some embodiments, the photoimagers track spots corresponding to each movable mirror in a reflector array all at the same time. In such embodiments, care must be taken in the positioning of the photoimager to prevent the misreading of the spots. This is illustrated by the simplified schematic view of FIG. 7, which depicts a pair of input beams 701, 702 directed onto the movable mirrors 703*a* of a reflector array 703. Placement of a photoimager in the plane defined by the line 704 results in giving the same reading for two different mirrors 703*a* and for two different light beams 701 and 702. This will lead to errors and is undesirable. Thus, care must be taken in positioning the photoimager 705. A satisfactory position for a photoimager can be determined using, for example, ray tracing algorithms or related methods. The photoimager 705 is positioned at a location and angle that results in no two light beams being mistaken for each other.

FIG. 8(*a*) depicts of another diagnostic device embodiment in an optical switch. The depicted embodiment employs a different type of photoimager. FIG. 8(*a*) is a depiction of a portion of a switch embodiment 800 that includes a plurality of optical fibers configured in an M×N array and arranged in an input fiber block 801, a plurality of M×N microlenses arranged in a microlens array 802, a reflector array 803 having a plurality of movable MEMS mirrors for steering input optical beams from input fibers to the remaining portions of the switch 804, whereby in the ordinary course of operation the input optical beams are directed into desired output fibers. For simplicity of explanation, the depicted embodiment is described with respect to a single movable mirror 803a, shown here receiving a single signal carrying optical input beam from a fiber in the fiber block 801 that travels along a signal path 805 to its designated output fiber (not shown here). As is known to those of ordinary skill in the art, in most embodiments, a plurality of signal carrying optical input beams are traveling along a plurality of signal paths. The depicted embodiment further includes a diagnostic device for monitoring and adjusting the movable mirrors of the reflector array 803. The diagnostic device includes a monitor illumination source 806 and a photoimager embodiment 810. The reflector array 803 and the photoimager 810 are connected to a controller 808. As with other embodiments, based on information provided by the photoimager 810, the controller 808 monitors and adjusts the position of the movable mirrors of the reflector array.

The depicted monitor illumination source 806 (also referred to as an illumination source) generates as many monitor light beams as needed. For simplicity of explanation, a single monitor light beam 807 is shown. In many embodiments, a monitor beam is generated for each one of the plurality of movable mirrors in the reflector array 803. The depicted monitor beam 807 is directed onto movable mirror 803a of the reflector array 803 along a monitor beam path. In the depicted embodiment, the monitor beam path is not the same as the signal path 805. The monitor light beams are reflected by a movable mirror 803a corresponding to that monitor light beam 807. The reflected monitor beam 807 is received by a photoimager embodiment 810 where it is used to monitor and adjust the orientation of movable mirror 803a. In some implementations, the photoimager 810 is sensitive to the wavelengths of light that are less than 1 μm.

The depicted photoimager 810 is configured slightly differently than the previously disclosed embodiments. In the depicted embodiment, the photoimager includes a single position sensitive photodetector 811, such as a "Duolateral Two-Dimensional PSD" position sensitive detector available from On-Trak Photonics, Inc. of Lake Forest, Calif. Such a position sensitive photodetector 811 provides photo-generated analog currents that can be measured to determine the position of a light beam impinging on the photodetector surface. The depicted photoimager 810 can also include a lens element 812 for focusing incident monitor beams on the position sensitive photodetector 811. Also incorporated in the photoimager 810 is a bi-stable mirror array 813. This device is also referred to as a Digital Micromirror Device (DMD) array. Such DMD arrays are described in "Digital Light Processing and MEMS: Timely Convergence for a Bright Future", SPIE Micromachining and Microfabrication 1995, which is hereby incorporated by reference. A mode of operation of this combination of components that comprises this embodiment of the photoimager 810 is described hereinbelow.

Figure 8A:
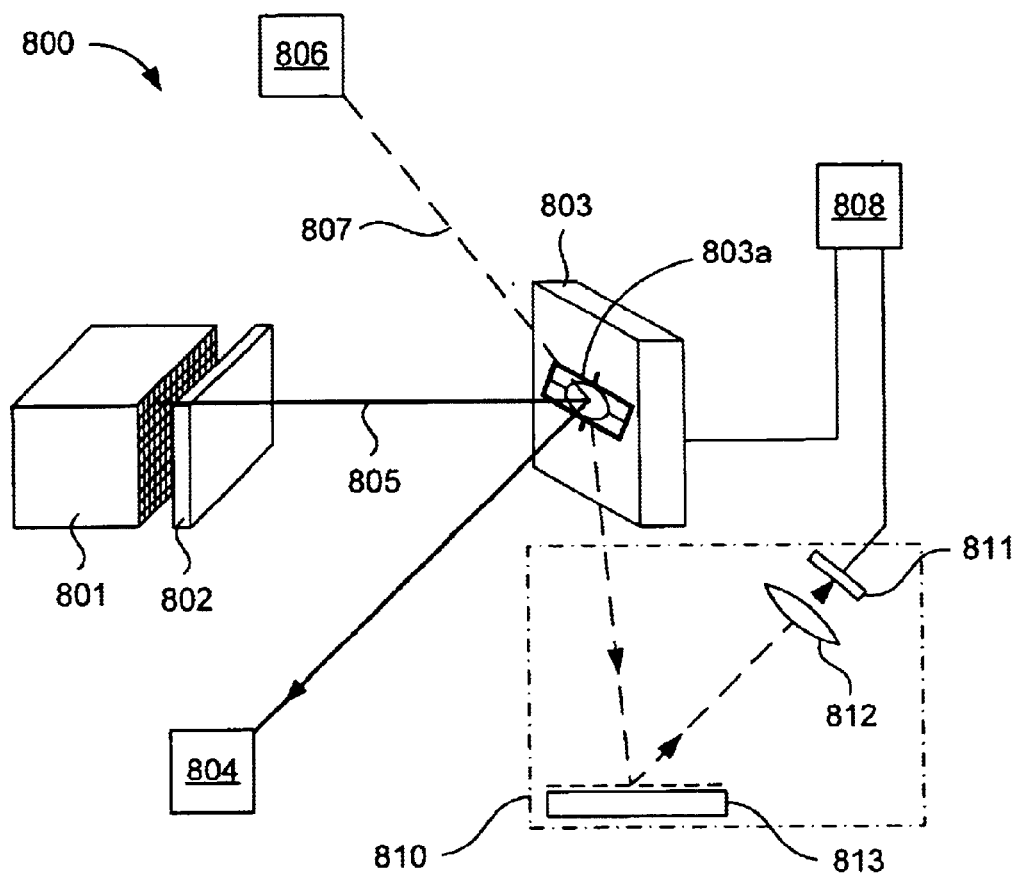
FIGS. 8(a) and 8(b) are illustrations of portions of switch and diagnostic device embodiments that incorporate bi-stable DMD arrays in implementing some photoimager embodiments in accordance with the principles of the present invention.
Figure 8B:
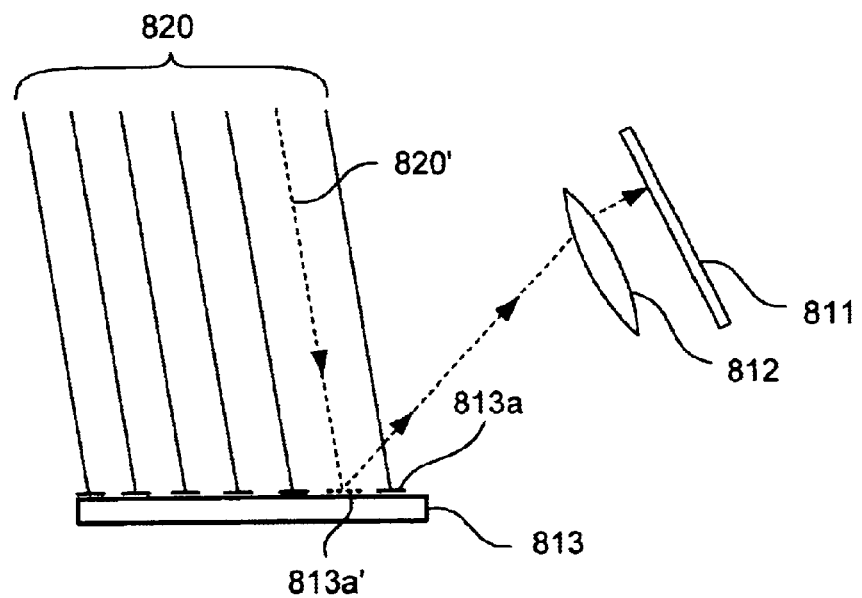

FIG. 8(b) depicts a photoimager embodiment as in FIG. 8(a). A plurality of monitor beams 820, 820' (represented by lines and dashed lines, respectively) are incident on a bi-stable mirror array 813. The bi-stable mirrors 813a, 813a' of the bi-stable mirror array 813 can be activated or inactive. When inactive (as in inactive mirrors 813a) the bi-stable mirrors do not reflect the incident monitor beams 820 toward the lens element 812 and the position sensitive photodetector 811. When a bi-stable mirror is activated, as shown by active bi-stable mirror 813a', the monitor beam 820' is reflected from the active bi-stable mirror 813a' through the lens element 812 onto the position sensitive photodetector 811. Thus, by selectively activating the mirrors of the bi-stable mirror array 813, selected monitor beams are detected by the position sensitive photodetector 811. In fact, in some embodiments each monitor beam can be individually monitored. This enables the individual monitoring and adjustment of each movable mirror of a reflector array. Each mirror of the bi-stable mirror array 813 can be activated one after another on a very short time scale, enabling each movable mirror of the reflector array to be individually monitored and adjusted. Thus, in this embodiment, each two-dimensional image created by the photoimager relates to a single movable mirror of the reflector array. Therefore, by using a single position sensitive photodetector 811, all of the movable mirrors of the reflector array can be monitored and adjusted for relatively low cost. One advantage of this embodiment is that it relies upon relatively low cost individual sensors rather than more expensive arrays of sensors. In a slightly higher cost embodiment, a greater number of position sensitive photodetectors can be used. For example, four or sixteen position sensitive photodetectors can be used in the photoimager rather than just one position sensitive photodetectors. This enables more monitor beams (and therefore more movable mirrors) to be monitored at the same time. Thus, at slightly higher cost, quicker monitoring and adjustment can be effected without resorting to more expensive photosensor arrays.

It is to be noted that, as in the other depicted embodiments, FIGS. 8(a) and 8(b) only depict a portion of an optical switch embodiment. Many embodiments have more than one reflector array. In such embodiments, the movable mirrors of the other reflector arrays also have diagnostic devices positioned to monitor and adjust the position of the mirrors of these reflector arrays.

Another aspect of the invention concerns the ability of illumination sources to generate a plurality of monitor beams for use in the small confines of an optical switch. To overcome such difficulties, the inventors describe a few embodiments capable of generating multiple optical beams for illuminating the movable reflectors in an optical switch.

Figure 9A:
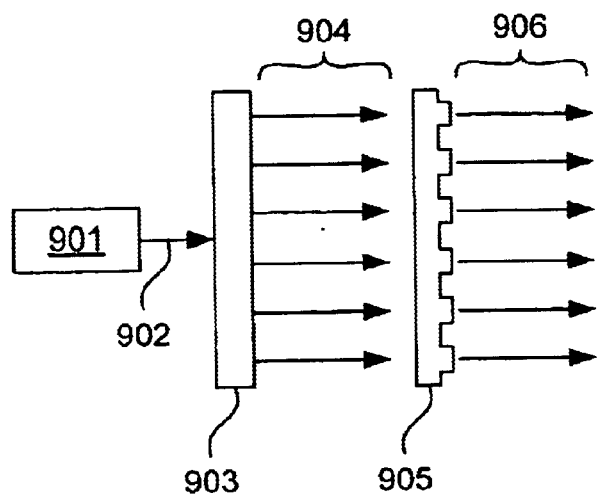
FIGS. 9(a)–9(d) are illustrations of apparatus embodiments capable of generating arrays of monitor optical beams for use in monitoring movable reflector orientation in optical switch embodiments of the present invention.

FIG. 9(a) depicts one embodiment of an illumination source capable of generating a plurality of collimated monitor beams from a single laser beam. A laser 901 produces a fiber coupled laser beam 902 that is directed into a fiber-optic splitter array 903 to produce a plurality of diverging free space optical beams 904. These beams 904 are collimated by lens array 905 to produce a plurality of collimated monitor beams 906. The plurality of monitor beams 906 are directed onto movable mirrors of a reflector array (not shown here) in accordance with many of the foregoing embodiments.

Figure 9B:
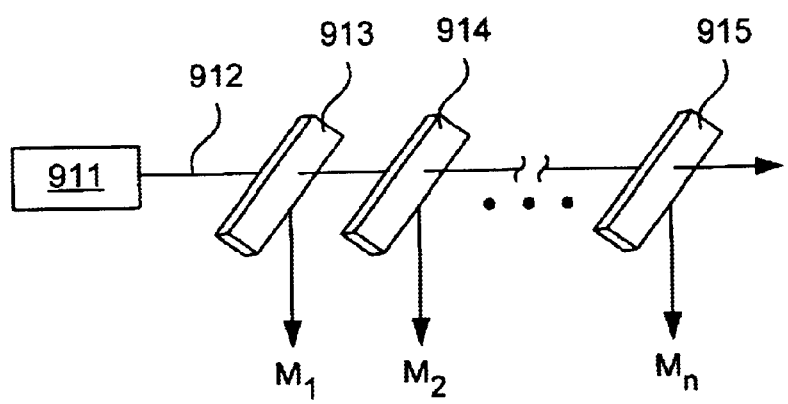

FIG. 9(b) depicts another embodiment of an illumination source capable of generating a plurality of monitor beams from a single laser beam. This embodiment uses a plurality of free space beam splitters (a beam splitter array) to generate a plurality of monitor beams. In such an arrangement, an array of n beam splitters can generate a one-dimensional monitor beam array comprising n monitor beams in an array one (1) beam wide and n beams long.

Using such an array, m lasers can be used to generate a two-dimensional m×n array of monitor beams. Alternatively, a single beam can be used to generate another two-dimensional m×n monitor beam array by cascading two one-dimensional m×n beam splitter arrays at right angles to each other. For simplicity's sake, FIG. 9(b) depicts an illumination source having a single array of n beam splitters. Using such a description, one having ordinary skill in the art is able to construct both one-dimensional and two-dimensional monitor beam arrays. A laser 911 produces a laser beam 912 that is directed into the array of n beam splitters (partially depicted here by beam splitters 913, 914, 915) to produce a plurality of monitor beams $M_1, M_2, \ldots M_n$. If, for example, n monitor beams of nearly equal optical power are desired, the transmissiveness of the beam splitters can be staged. For example, the first beam can be generated by a 1−(1/n) beam splitter that reflects (1/n)×(100)% of the light and transmits the rest of the light. A second beam is generated by passing the remaining light through a 1−(1/(n−1)) beam splitter that reflects (1/(n−1))×(100)% of the light from the previous beam splitter and transmits the remaining light, and so on, until the last (n th) beam splitter reflects all the light. A specific example using ten beam splitters follows: the first beam splitter can be a 90% beam splitter (transmitting 90% of the incident light and reflecting 10% as a first monitor beam). A second beam splitter can be an 88.9% beam splitter (transmitting 88.9% of the incident light and reflecting 11.1% as a second monitor beam) which results in a second monitor beam having about the same optical power as the first monitor beam. A third beam splitter can be an 87.5% beam splitter (transmitting 87.5% of the incident light and reflecting 12.5% as a third monitor beam), which results in a third monitor beam having the same optical power as the first and second monitor beams. The beam splitter array continues with appropriate beam splitters until the tenth "beam splitter", which reflects all the incident light to generate a tenth monitor beam having about the same optical power as all the others. The plurality of monitor beams $M_1, M_2, \ldots M_n$ are directed onto movable mirrors of a reflector array (not shown here) in accordance with many of the foregoing embodiments.

Figure 9C:
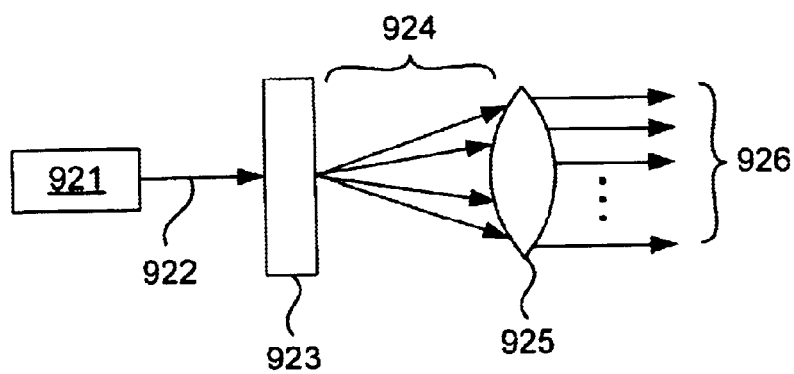

FIG. 9(c) depicts still another embodiment of an illumination source capable of generating a plurality of collimated monitor beams from a single laser beam. A laser 921 produces a laser beam 922 that is directed into a holographic grating 923 that produces a plurality of n monitor beams 926. The holographic grating 923 is encoded with a pattern that determines the beam splitting pattern of n output beams 924. The output beams 924 can be in a one-dimensional or two-dimensional pattern based on the phase pattern of the holographic grating. The plurality of monitor beams 924 are directed into a lens element 925 that can collimate the output beams 924, generating a plurality of parallel monitor beams 926. Alternatively, the lens element 925 can be used to produce non-parallel monitor beams, if desired. The plurality of monitor beams 926 are then directed onto movable mirrors of a reflector array (not shown here) in accordance with many of the foregoing embodiments.

Figure 9D:
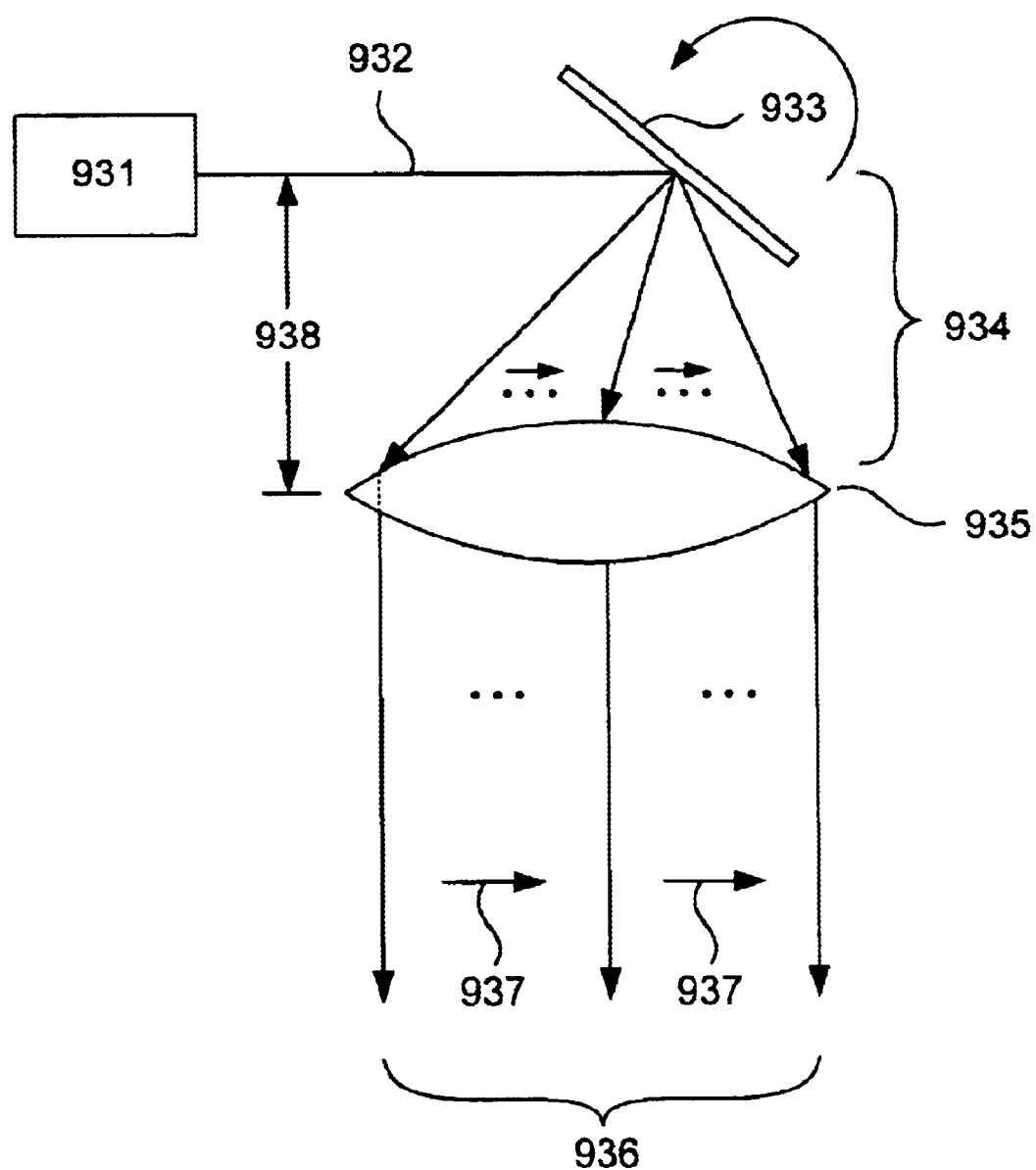

FIG. 9(d) depicts still another embodiment of an illumination source capable of generating a plurality of collimated monitor beams from a single laser beam. A laser 931 produces a plurality of pulsed laser beams 932 that is directed onto a rotating scanning mirror 933 that produces a plurality of reflected beams 934 (shown here by a plurality of arrows). The plurality of reflected beams 934 are collimated by passing the plurality of reflected beams 934 through lens 935, thereby producing a plurality of parallel monitor beams 936. As an alternative to a single lens 935 an array of lenses can be used. Such an array will have lenses spaced so that light passing through them is incident on an associated movable mirror of the reflector array. The pulsed beams of light are synchronized with the rotation rate of the rotating scanning mirror so that the plurality of parallel monitor beams 936 are scanned one after another in a direction indicated by arrows 937. The plurality of parallel monitor beams 936 are directed toward the movable mirrors of a reflector array (not shown). In this way a single laser can illuminate a plurality of movable mirrors of a reflector array as it scans through them one after another.

In a related, but slightly different embodiment the pulsed laser is replaced with a continuous laser. The continuous laser beam can be reflected from the rotating scanning mirror to produce a rotating beam of light (a sheet or plane of light). The rotating beam of light passes through the lens (or an array of precisely arranged lenses) to produce a collimated plane of light producing a scanning monitor beam of parallel light. The scanning monitor beam scans in a direction indicated by arrows 937. The scanning monitor beam is directed toward the movable mirrors of a reflector array (not shown). In this way a single laser can illuminate a plurality of movable mirrors of a reflector array as it scans through them one after another.

The above described rotating scanning mirror illumination sources can measure the angles of movable mirrors in a reflector array without introducing errors based on uncertainties in the angle of the rotating scanning mirror 933. In the embodiment shown in FIG. 9(d), a lens 935 is placed at a distance 938 approximately equal to the focal length of the lens 935 from each rotating scanning mirror 933. In one implementation, the distance 938 is about the same as the focal length f of the lens 938. In a more preferred embodiment, the relationship between lens 935 position and rotating scanning mirror 933 position is defined by:

$$\frac{1}{d_{mirr}} + \frac{1}{d_{meas}} = \frac{1}{f}$$

where f is the focal length of the lens, $d_{mirr}$ is the spacing from the rotating scanning mirror 933 to the lens 935 (this is shown by distance 938), and $d_{meas}$ is the total distance from the lens 935 to the movable mirror to be measured (on the reflector array, not shown here), plus the distance from the mirror measured (on the reflector array, not shown here) to the photoimager measured (also, not shown here). In general, the path length from the lens to the position sensitive detector $d_{meas}$ is much greater than the lens focal length f, so the lens is spaced from the scanning mirror by approximately the lens focal length f, or $d_{mirr}$.

In the above-described implementation, an array comprising 1×N mirrors can be scanned (and monitored) one after another using a single laser and a single rotating scanning mirror. The monitor beam(s) are received by the photoimager which monitors movable mirror position in the reflector array as do the other embodiments. In another implementation, M lasers can be used to produce M laser beams which are directed into M rotating scanning mirrors to produce M rotating reflected beams. The M rotating scanning mirrors can be stacked one over the other so that a plurality of M laser beams is produced, each beam parallel to the others and stacked one over the other. Each of the M beams passes through the collimating lens and is directed onto the mirrors of the M×N reflector array. Each of the collimated beams is then directed onto a corresponding column of mirrors of the reflector array. In this way M columns can be illuminated. As the each rotating scanning mirror rotates, each of the collimated beams illuminates a row of N mirrors. Thereby, a M×N reflector array can be monitored.

One suitable device for implementing the above embodiments uses a scanning mirror such as the Mikro-scanner 1.2 from CMS Mikrosysteme (Chemnitz Germany), in which the mirror is scanned continuously in periodic motion at its resonant frequency. In one implementation, the laser beam is generated by a pulsed laser source where the laser beam is turned on briefly only when the laser beam is directed in the direction of the movable mirror to be measured.

In other embodiments, a rotating scanning mirror can be mounted so that it rotates in two axes using an approach similar to that used for the movable mirrors of the reflector array. In this way a single laser and a single rotating scanning mirror can be used to scan (monitor) each of the movable mirrors in a M×N reflector array. Other implementations are possible.

Figure 10:
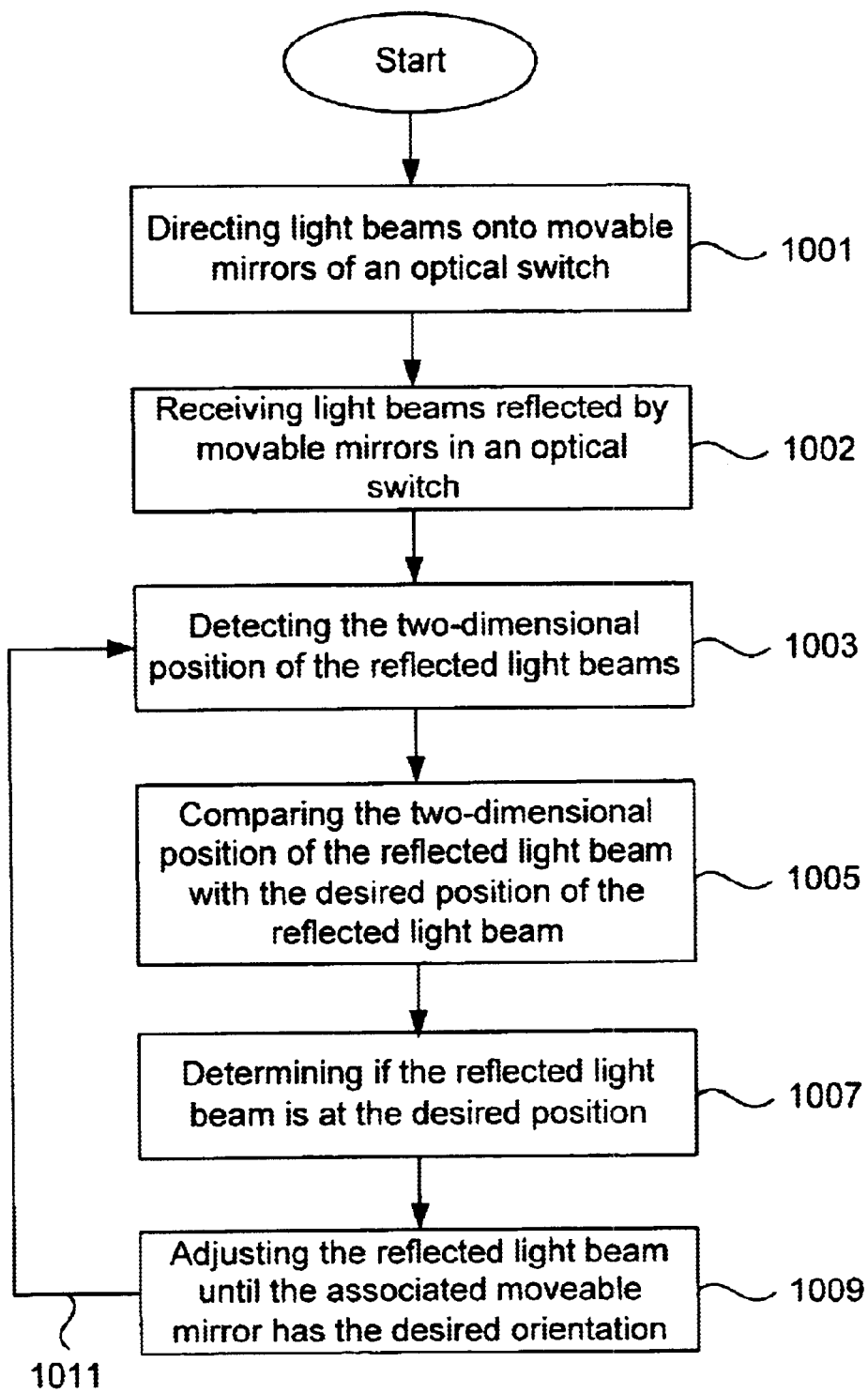
FIG. 10 is a flowchart diagram of a method embodiment in accordance with the present invention.

FIG. 10 is a flow diagram depicting a method for detecting whether movable mirrors in an optical switch have a desired orientation. The method comprises generating light beams which are directed toward the movable mirrors of the optical switch (Step 1001) and, subsequently, receiving light beams reflected from the movable mirrors of the optical switch (Step 1002). The light beams can be, for example, the signal carrying optical beams in the switch or alternatively, monitor beams generated by a monitor beam illumination source within the switch. Examples of such approaches have been set forth in detail above. In particular, obliquely directed monitor beams can be directed onto the reflector array where the movable mirrors reflect the monitor beams into a photoimager. Such monitor beams do not travel along optical paths of signal carrying optical beams. One such embodiment is shown in, for example, FIG. 5(a). The method continues by detecting the two-dimensional position of the reflected light beams (Step 1003). Approaches for detecting such light beams are well detailed hereinabove. The two-dimensional position of the reflected light beam is compared with a two-dimensional position of a light beam reflected from a corresponding movable mirror having the desired orientation (Step 1005). Such comparison can be, for example, comparison of the two-dimensional position of the reflected light beam with the two-dimensional position of a light beam being reflected by a mirror having the desired orientation. Such information can be stored, for example, in a look-up table of a controller system. A determination is then made as to whether the movable mirror is positioned having the desired orientation (Step 1007) and the position of the affected mirror can be adjusted (Step 1009). These steps are typically accomplished by a controller which adjusts mirror position until the two-dimensional position of the reflected beam matches the two-dimensional position stored in the look-up table. Once the match is achieved, the mirror is properly adjusted. An alternative approach includes monitoring the two-dimensional position of the reflected beam and correcting this position back to a desired position if the reflected beam drifts. Also, this process can be periodically repeated to continuously monitor and maintain mirror alignment (Step 1011). Other approaches known to persons having ordinary skill in the art may also be used to monitor and adjust mirror position.

Also in accordance with the principles of the present invention, certain methods and apparatus can be used to correct for changes in optical alignment caused by temperature variation in optical switch embodiments. One approach to minimizing the effects of temperature variation is to monitor mirror orientation both externally and internally. Such internal monitoring is accomplished, for example, by any of the approaches previously disclosed herein. External monitoring can be accomplished by, for example, monitoring input optical power in an input optical channel and monitoring the output optical power in the associated output optical channel to establish a calibration channel. One having ordinary skill in the art can use external measurements of input optical power and output optical power to determine mirror orientation. For example, one such suitable method is disclosed in the U.S. Patent Application entitled: "Feedback Stabilization of a Loss Optimized Switch", filed on Apr. 30, 2000, Serial No. 09/548,587, which is hereby incorporated by reference. In this way, all of the internal monitoring can be calibrated to the calibration channel defined by the external measurements of optical power to reduce or remove inaccuracies caused by variations in temperature.

Figure 11A:
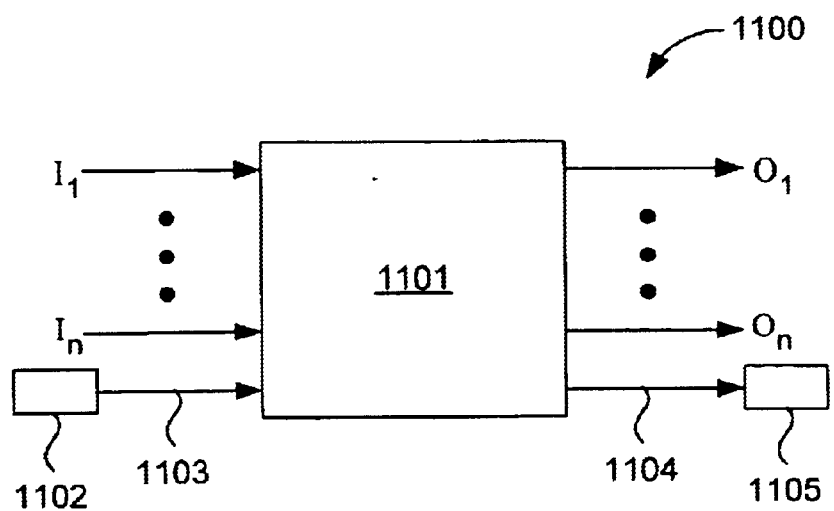
FIGS. 11(a) and 11(b) are block diagrams of switch embodiments that can be used to calibrate the effect of temperature changes in optical switches of the present invention.

One such implementation is depicted by the block diagram of FIG. 11(a). FIG. 11(a) depicts a switch embodiment 1100 having n input signals $I_1 \ldots I_n$ that are input into a switch element 1101 that outputs n corresponding output signals $O_1 \ldots O_n$. The mode of operation of these input and output signals is as described by any of the embodiments disclosed herein. In order to calibrate a calibration channel for use in calibrating internal measurements of reflector position, one or several separate calibration channel(s) are established. In the depicted embodiment, a separate calibration laser 1102 generates a calibration input beam 1103 that is input into an optical channel of the switch element 1101. The optical power of this calibration input beam 1103 can be measured by a wide variety of detectors. The calibration input beam 1103 passes through the switch element 1101 and emerges as a calibration output beam 1104 that is monitored by a detector 1105. Using signal processing techniques known to those having ordinary skill in the art, the optical power of the calibration input beam 1103 can be compared with optical power of the calibration output beam 1104 to determine a calibration mirror orientation inside the switch element 1101. Similarly, internal monitoring of the same calibration mirror provides an internal reading of mirror orientation. Comparison of the internal reading of mirror orientation with that of the external reading of mirror orientation will reveal any differences between the readings caused by, for example, environmental factors (e.g., temperature, etc.). Suitable adjustments are made to correct for the differences in the readings. Such adjustments can be applied to all the internal monitoring, thereby calibrating the internal monitoring of mirror positions. In one embodiment, five (5) calibration channels can be provided to measure and compensate for five axes of misalignment between the input fibers. In one example, the optical switch of FIG. 1A is sensitive to two (2) translation axes and three (3) rotation axes of the input fiber array 102 with respect to the output fiber array 112. The switch is much less sensitive to translation misalignment between the input fiber array 102 and the lens array 104 along the axis of beam propagation.

Figure 11B:
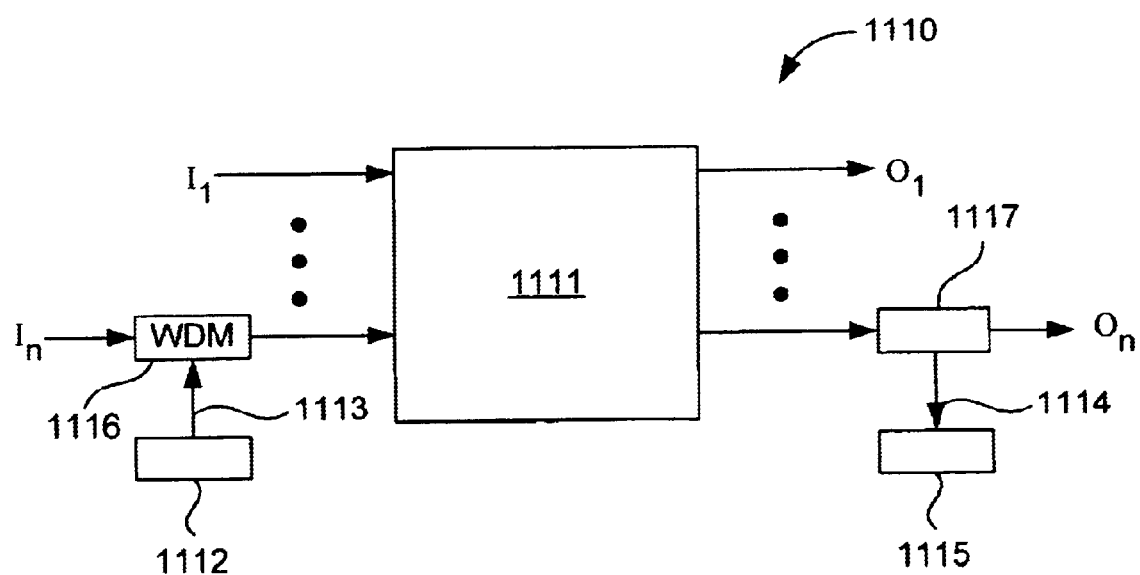

In another slightly different embodiment, FIG. 11(b) depicts a switch embodiment 1110 having n input signals $I_1 \ldots I_n$ that are input into a switch element 1111 that outputs n corresponding output signals $O_1 \ldots O_n$. The modes of operation of these input and output signals are as described by any of the embodiments disclosed herein. In order to generate a calibration channel for use in calibrating internal measurements of reflector position, a separate calibration channel is established. In the depicted embodiment, a separate calibration laser 1112 generates a calibration input beam 1113 that is input into wave division multiplexer (WDM) 1116, which inputs the calibration input beam 1113 as an optical channel of the switch element 1111. The optical power of this calibration input beam 1113 is measured and passes through the switch element 1111, and is output from the switch element 1111 into a demultiplexer 1117 that extracts a calibration output beam 1114 that is monitored by a detector 1115. As with the previous embodiment, known signal processing techniques are used to compare optical power of the calibration input beam 1113 with optical power of the calibration output beam 1114 to determine mirror orientation inside the switch element 1111. Again, internal monitoring of the same mirror provides an internal reading of mirror orientation. Comparison of the internal reading of mirror orientation with that of the external reading of mirror orientation will reveal any differences between the readings caused by, for example, environmental factors. Suitable adjustments are made to correct for the differences in the readings. Such adjustments can be applied to all the internal monitoring, thereby calibrating the internal monitoring of mirror positions. Again, in preferred implementation, five calibration channels are used to compensate for the five most sensitive axes of misalignment.

The present invention has been particularly shown and described with respect to certain preferred embodiments and specific features thereof. However, it should be readily apparent to those of ordinary skill in the art that various changes and modifications in form and detail may be made without departing from the spirit and scope of the invention as set forth in the appended claims. In particular, it is contemplated by the inventors that the principles of the present invention can be practiced with optical switch embodiments having one, two, three, and more reflector arrays. Noting also, that each reflector array can be illuminated with its own array of monitor beams. Also, the principles of the present invention may be practiced with switches having other structures and reflector geometries. For example, although the invention is illustrated using MEMS reflectors, other reflectors or mechanisms can be used. Furthermore, the examples provided herein are intended to be illustrative rather than limiting. The inventions illustratively disclosed herein can be practiced without any element which is not specifically disclosed herein.

We claim:

1. A diagnostic device for detecting the alignment of movable reflectors in an optical switch, where the optical switch includes an array of optical input fibers, an array of output optical fibers, and at least one reflector array having a plurality of movable mirrors where each mirror can occupy a plurality of positions, the movable mirrors configured to steer input light beams received from the array of input optical fibers along a signal path so that each input light beam can be switched to one of a plurality of output optical fibers as an output beam, the device comprising:
    a two-dimensional photoimager positioned to receive light from the reflector array to create a two-dimensional image of the reflector array and wherein each movable mirror of the reflector array reflects light to a different two-dimensional position on the photoimager depending on the current position of each movable mirror; and
    a controller that is able to adjust the movable mirrors of the reflector array according to light received at the photoimager.

2. A diagnostic device as in claim 1, wherein the array of optical input fibers and the array of output optical fibers are included as part of a single optical fiber array.

3. A diagnostic device as in claim 1, wherein the optical switch further includes:
    a first beam splitter arranged to reflect a portion of the light from each output beam into the two-dimensional photoimager.

4. A diagnostic device as in claim 3, wherein the optical switch further includes:
    a second two-dimensional photoimager connected to the controller; and
    a second beam splitter arranged to reflect a portion of the light from each input beam into the second two-dimensional photoimager, wherein the controller can adjust the movable mirrors of the reflector array according to light received at the photoimager and the second photoimager.

5. A diagnostic device as in claim 1, wherein each reflector array further includes a corresponding monitor illumination source positioned to illuminate the movable mirrors of the reflector array so that light from the illumination source is reflected by the movable mirrors onto the two-dimensional photoimager to create a two-dimensional image of the reflector array and wherein each movable mirror of the reflector array reflects light to a different two-dimensional position on the photoimager depending on the current position of each movable mirror.

6. A diagnostic device as in claim 5, wherein the two-dimensional photoimager comprises an array of position sensitive photodetectors.

7. A diagnostic device as in claim 5, wherein the two-dimensional photoimager comprises a photosensor array.

8. The diagnostic device of claim 7, wherein the photosensor array includes a CCD detector array.

9. The diagnostic device of claim 7, wherein the photosensor array includes an array of CMOS photodetectors.

10. The diagnostic device of claim 7, wherein the photosensor array includes an array of quadrature photodetectors.

11. The diagnostic device of claim 5, wherein the two-dimensional photoimager includes:
    an array of bi-stable mirror elements;
    a duolateral position sensitive photodetector; and
    wherein the monitor illumination source projects light onto the mirrors of the reflector array which is reflected from the mirrors onto the bi-stable mirror elements which are selectively activated to selectively reflect light from the activated bi-stable mirror elements onto the duolateral position sensitive photodetector so that the duolateral position sensitive photodetector can detect the orientation of the movable reflector corresponding to the activated bi-stable mirror element.

12. A diagnostic device as in claim 5, wherein the monitor illumination source generates an array of monitor beams that are directed onto corresponding movable mirrors of the reflector element so that each monitor beam is reflected by its corresponding movable mirror onto the two-dimensional photoimager to create a two-dimensional image of the reflector array.

13. A diagnostic device as in claim 12, wherein the array of monitor beams is generated by a plurality of laser beams arranged to provide the array of monitor beams.

14. A diagnostic device as in claim 12, wherein the array of monitor beams is generated by a single laser beam split into a plurality of monitor light beams to generate the array of monitor beams.

15. A diagnostic device as in claim 5, wherein the light from the illumination source is transmitted at a first wavelength and the input light beams are transmitted in at least one other wavelength.

16. A diagnostic device as in claim 15, wherein the light from the illumination source is transmitted at a wavelength of less than about 1 μm and wherein the input light beams are transmitted having a wavelength of greater than 1 μm.

17. A diagnostic device as in claim 15, wherein the reflector array includes an anti-reflective covering having a first transmission bandwidth for transmitting light from the illumination source at the first wavelength and a second transmission bandwidth for transmitting the input light beams at the at least one other wavelength.

18. A diagnostic device as in claim 17, wherein the first transmission bandwidth of the anti-reflective covering transmits light in a bandwidth between about 0.75 μm to about 0.85 μm and wherein the second transmission bandwidth transmits light at greater than about 1 μm and wherein the anti-reflective covering has satisfactory optical performance for optical beams incident on the anti-reflective covering at angles ranging from about 5 degrees to about 55 degrees.

19. A diagnostic device as in claim 17, wherein the light from the illumination source is transmitted at a wavelength in the range of about 0.75 μm to about 0.85 μm and wherein the input light beams are transmitted having a wavelength in the range of about 1.3 μm to about 1.55 μm.

20. A diagnostic device as in claim 1, further including a dedicated optical channel for calibrating the switch for temperature effects.

21. A diagnostic device as in claim 20, wherein the dedicated optical channel includes
a laser that produces a calibration light beam which is directed onto a movable mirror of the reflector array;
a detector for receiving the calibration beam from the movable mirror of the reflector array; and
wherein the controller is electrically connected between the detector for receiving the calibration beam, photoimager, and the reflector array, which is able to account for temperature dependant variation in measurement of reflector position and adjust the movable mirrors of the reflector array accordingly.

22. A diagnostic device as in claim 1, wherein one of the input light beams is used for calibrating the switch for temperature effects.

23. A diagnostic device in an optical switch having an array of optical input fibers configured to carry input light beams; an array of output fibers; at least one switching element having a reflector array with a plurality of movable mirrors, each movable mirror adjustable to a plurality of positions, suitable for reflecting selected input light beams received from selected input fibers into selected output fibers enabling the switching of each input light beam along a signal path to one of a plurality of output fibers as an output beam; the diagnostic device comprising:
an illumination source for directing at least one monitor light beam onto the movable mirrors of the reflector array;
a photoimager arranged to receive monitor light beams reflected from the movable mirrors of the reflector array to provide two-dimensional information concerning the position of the movable mirrors, with each movable mirror of the reflector array reflecting light onto a different two-dimensional position on the photoimager depending on which one of the plurality of positions each mirror currently occupies; and
a controller for adjusting the position of the movable mirrors of the reflector array according to light received at the photoimager.

24. In the optical switch of claim 23, wherein the array of optical input fibers and the array of output optical fibers are included as part of a single optical fiber array.

25. The diagnostic device of claim 23, wherein the illumination source is positioned with respect to the photoimager such that the monitor light beams reflected from the movable mirrors of the reflector array are not coincident with the signal path.

26. The diagnostic device of claim 25, wherein the illumination source generates an array of monitor light beams that are directed onto the movable mirrors of the reflector array.

27. The diagnostic device of claim 26, wherein the array of monitor light beams is generated by a single laser beam split into a plurality of monitor light beams.

28. The diagnostic device of claim 26, wherein the photoimager includes a detector selected from the group consisting of an array of CCD photodetectors, an array of CMOS photodetectors, an array of quadrature photodetectors, a single duolateral position sensitive photodetector, and an array of duolateral position sensitive photodetectors.

29. The diagnostic device of claim 23, wherein the monitor light beams illuminate the movable mirrors of the reflector array with light having a first wavelength and wherein the input and output beams are at another different wavelength.

30. The diagnostic device of claim 29, wherein the input and output beams at another different wavelength comprise light beams at a plurality of different wavelengths.

31. The diagnostic device of claim 29, wherein the reflector array includes an anti-reflective coating that has a transmission peak for transmitting monitor beams having the first wavelength and a transmission bandwidth for transmitting the input and output beams at the another different wavelength.

32. The diagnostic device of claim 31, wherein the optical characteristics of the anti-reflective coating are optimized for light beams incident on the anti-reflective coating at angles ranging from about 5 degrees to about 55 degrees and wherein the anti-reflective coating includes a transmission peak centered at about 0.8 μm and a transmission bandwidth for transmitting light at wavelengths greater than 1.0 μm.

33. The diagnostic device of claim 23, wherein the monitor light beams illuminate the movable mirrors of the reflector array with light having a first wavelength less than 1 μm and wherein the input and output beams are at another wavelength greater than 1 μm.

34. The switch of claim 23, wherein the photoimager includes a duolateral position sensitive photodetector.

35. The switch of claim 34, wherein the photoimager, including the duolateral position sensitive photodetector, further includes:
an array of bi-stable mirror elements positioned such that the light reflected from the reflector array is projected onto the bi-stable mirror elements which are selectively activated to selectively reflect the light onto the duolateral position sensitive light detector so that the duolateral position sensitive light detector can detect the orientation of a movable mirror that corresponds to the activated bi-stable mirror element.

36. A method for detecting whether movable mirrors in an optical switch have a desired orientation, the optical switch having an array of optical input fibers configured to carry input light beams; an array of output fibers; at least one switching element having a reflector array with a plurality of movable mirrors, each movable mirror adjustable to a plurality of positions, suitable for reflecting selected input light beams received from selected input fibers into selected output fibers enabling the switching of each input light beam along a signal path to one of a plurality of output fibers as an output beam, the method comprising the steps of:

directing at least one light beam onto movable mirrors of a reflector array in an optical switch;

receiving at least one light beam reflected from the movable mirrors of the reflector array such that the light beam can form an optical image of the at least one reflected beam;

detecting the two-dimensional position of the at least one reflected light beam;

comparing the two-dimensional position of the reflected light beam with a desired two-dimensional position that corresponds to that of a movable mirror having the desired orientation; and determining whether the movable mirror is positioned having the desired orientation.

37. The method of claim 36, further including the step of adjusting the movable mirror if the movable mirror is not positioned having the desired orientation, the adjusting continuing until the movable mirror attains the desired orientation.

38. The method of claim 36, wherein the steps of directing and receiving include directing the light beam onto movable mirrors of a reflector and receiving the light beam once reflected from the corresponding movable mirrors in a manner such that the optical path of the monitor beams is not coincident with the signal path.

39. The method of claim 36, wherein the steps of:

directing the light beam onto the movable mirrors of a reflector includes directing an array of monitor light beams onto corresponding movable mirrors of the reflector array; and receiving the light beam includes receiving the monitor light beams once reflected from the corresponding movable mirrors of the reflector array.

40. The method of claim 39, wherein the step of receiving the monitor light beams reflected from the movable mirrors of the reflector array includes selectively reflecting the received monitor light beams;

and wherein the step of detecting includes the step of detecting the two-dimensional position of the selectively reflected monitor light beams.

\* \* \* \* \*

UNITED STATES PATENT AND TRADEMARK OFFICE
CERTIFICATE OF CORRECTION

PATENT NO. : 6,788,842 B1
DATED : September 7, 2004
INVENTOR(S) : Sink et al.

It is certified that error appears in the above-identified patent and that said Letters Patent is hereby corrected as shown below:

Column 1,
Line 21, change "commercially fill viable" to -- commercially viable --.

Signed and Sealed this

Twenty-first Day of December, 2004

JON W. DUDAS
*Director of the United States Patent and Trademark Office*